United States Patent [19]

Yamamoto et al.

[11] 4,379,336

[45] Apr. 5, 1983

[54] MODULAR CALCULATOR WITH SEPARABLE KEYBOARD AND DISPLAY MODULES

[75] Inventors: Hideo Yamamoto, Mission Viejo; Susumu Takase, Costa Mesa; R. Dale Thomas, Irvine, all of Calif.

[73] Assignee: Canon Business Machines, Inc., Costa Mesa, Calif.

[21] Appl. No.: 154,866

[22] Filed: May 30, 1980

[51] Int. Cl.[3] ............................................. G06F 15/02
[52] U.S. Cl. .................................................... 364/708
[58] Field of Search .......................... 364/708, 709, 710

[56] References Cited

U.S. PATENT DOCUMENTS

| | | | |
|---|---|---|---|
| 3,971,925 | 7/1976 | Wenninger et al. | 364/709 |
| 4,038,535 | 7/1977 | Aldridge et al. | 364/708 |
| 4,220,992 | 9/1980 | Blood et al. | 364/709 X |
| 4,259,668 | 3/1981 | Nishimura et al. | 364/710 X |

OTHER PUBLICATIONS

Specifications for Impact Dot Matrix Mini Printer Model-210, C. Itoh Electronics, Inc., 280 Park Ave., N.Y., N.Y., Feb. 23, 1979.
Sharp 2L-6000 Electronic Calculator, sales brochure 6Y50E, Sharp Electronics Corp., Paramus, N.J., 1979.
*Markline Spring 1980 Catalog*, Markline, Waltham, MA, 1980, pp. 4 & 13.
*Office Product News*, vol. 14, No. 7, Dec. 1979, p. 4.
*Monroe 2850*, sales brochure 2044A, Monroe, Morris Plains, N.J., 1978.
*IC Master 1980*, United Technical Publications, Inc., Garden City, N.Y., 1980, pp. 2311-2322.

Primary Examiner—David H. Malzahn
Attorney, Agent, or Firm—Fitzpatrick, Cella, Harper & Scinto

[57] ABSTRACT

A modular calculator system using interchangeable input modules and output modules provides several different calculators using the same output display components to avoid expensive duplication of parts. The input module contains the calculator keyboard and program-control circuits which establish predetermined calculator functional capabilities, such as basic arithmetic or scientific functions. The output module houses and drives a printer and visual display components. Data from the input module is communicated serially over a single line to the output module so that a single reliable and inexpensive electrical connection may be used. An overlapping flange mechanical coupling physically connects the modules to form a combined unitary calculator housing.

28 Claims, 13 Drawing Figures

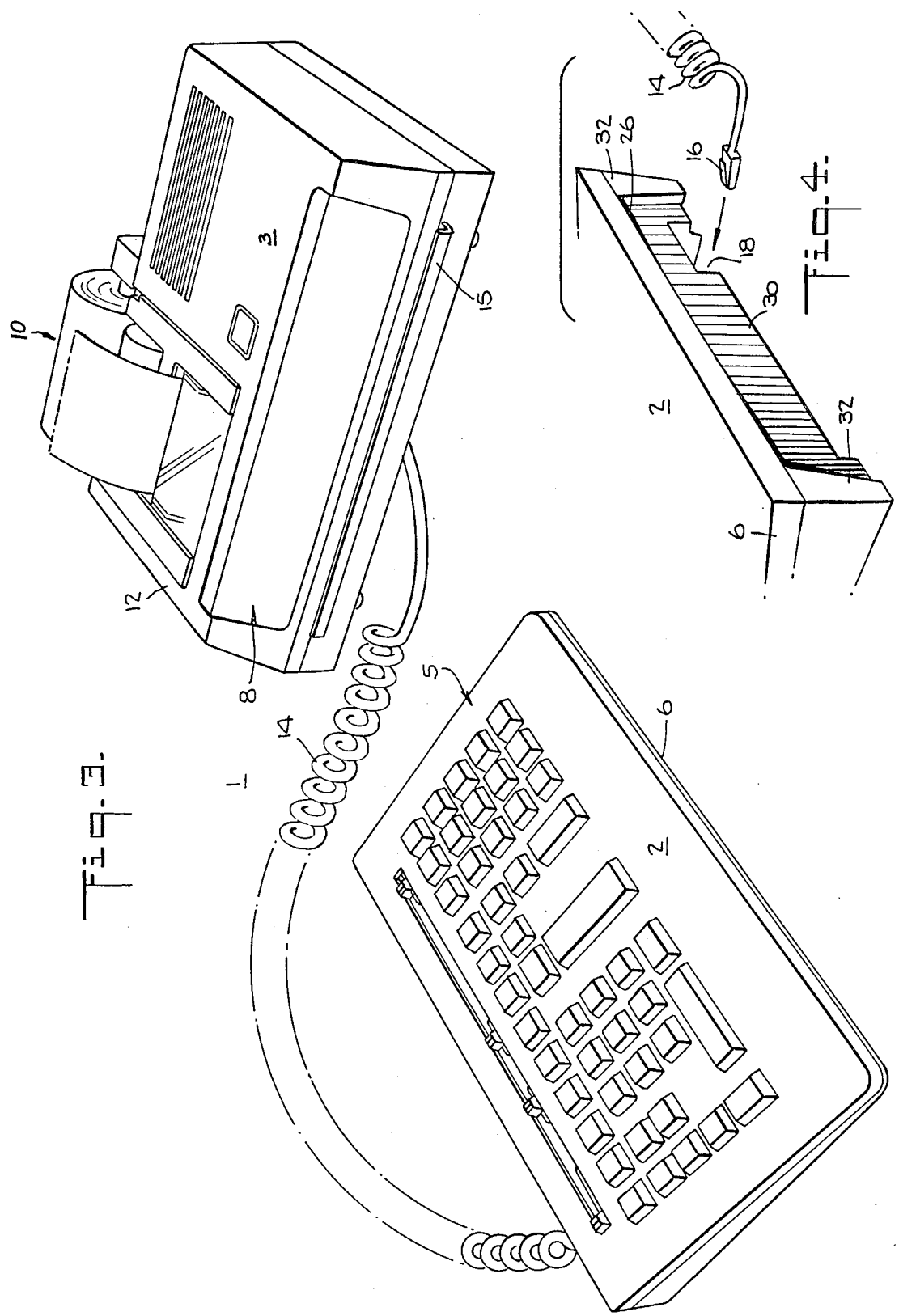

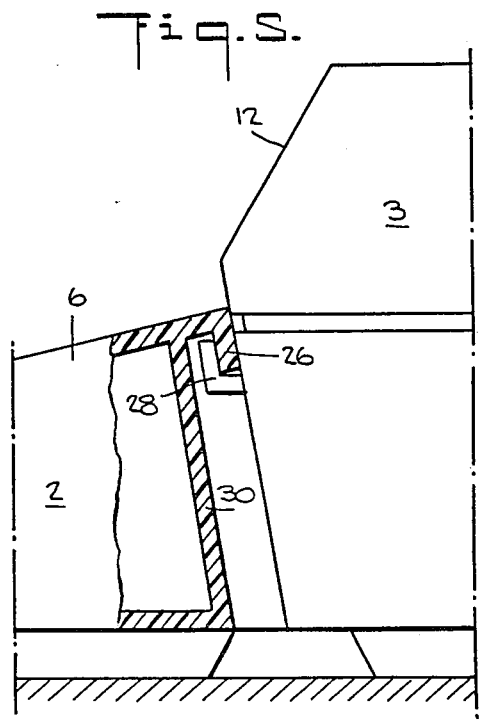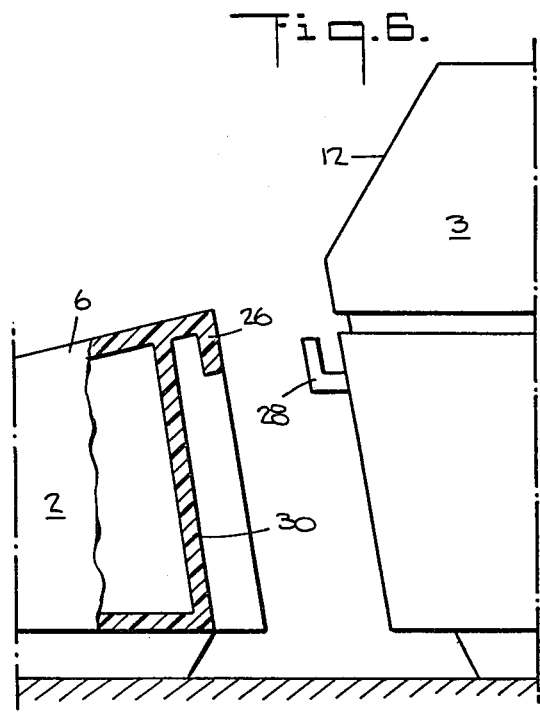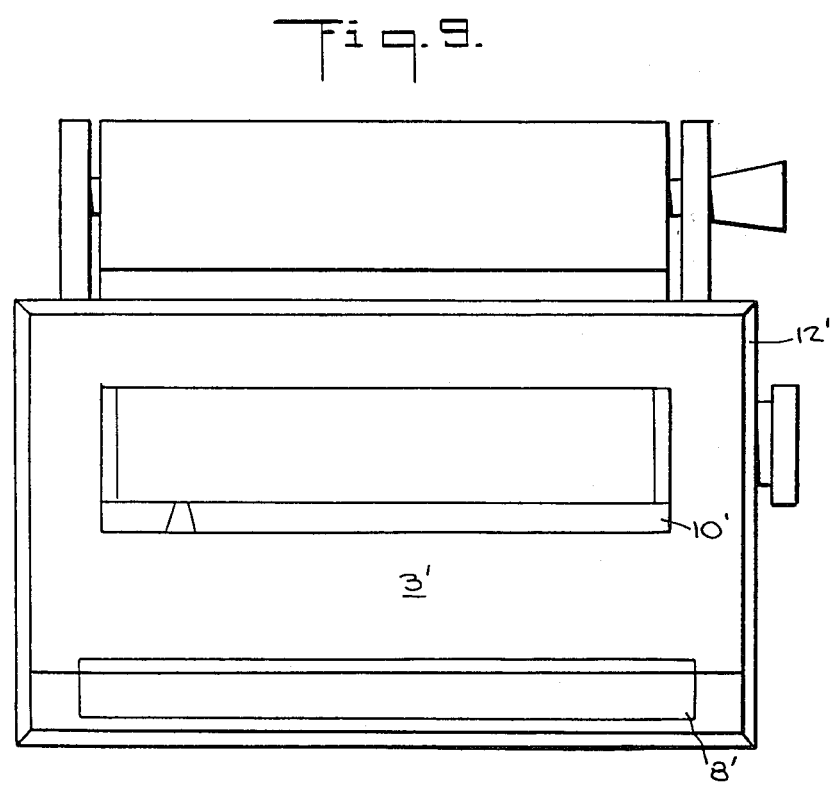

MODULAR CALCULATOR WITH SEPARABLE KEYBOARD AND DISPLAY MODULES

BACKGROUND OF THE INVENTION

1. Field of the Invention

This invention relates to electronic calculators, particularly large calculators of the desk-top type for office use.

2. Description of the Prior Art

Conventional desk top calculators have their calculation and display components mounted in a single integral housing. The calculation components include a keyboard with data keys and function keys. Data (e.g. numerals 0 to 9) is entered into the calculator by operation of the data keys and the calculator processes the data in accordance with functions (e.g. +, −, ×, ÷, etc.) selected by operation of the function keys. The tops of the keys usually have identification symbols corresponding to the data or functions controlled by the respective keys. The display components of the calculator include either a lighted display or a printer, or both, to display the entry of data, the calculation function carried out and the results of the calculation.

There are various types of desk top calculators; and they differ essentially according to the types of calculation functions which they perform. Basic calculators perform basic arithmetic functions such as addition, subtraction, multiplication and division. Other calculators, perform scientific functions including exponential, logarithmic and trigonometric functions. In addition, there are a number of specialized calculators available that perform specialized functions to fulfill the requirements of particular industries, such as bank teller and loan financing operations.

Although some calculation functions are common to different types of calculators, it is often necessary, to use different types of calculators in cases where substantially different types of calculations are to be carried out. This becomes quite costly because it requires the purchase of an entire new calculator with its own separate display components, for each general type of calculation function to be performed.

It is known to provide a programmable calculator whose calculation capabilities can be changed by substituting a new program. The calculator function program controls the operations carried out by the calculator in response to pressing the function keys; and, where a new program is substituted, the functions carried out when the function keys are pressed are different from what they were for the original program. Although the programmable calculator uses the same display components for different function programs, such programmable arrangements tend to be expensive and complex. Also, because the programs are changed without a corresponding key change, the key identification symbols do not correspond to the functions that the respective keys activate. This leads to operator confusion and error. Some use has been made of templates which are placed over the keys when the program is changed to indicate to the user what new functions are activated by the same keys. However, the use of templates is awkward; and, if the wrong template is installed, error or confusion will still occur.

Other attempts have been made to increase the versatility of desk type calculators without duplication of expensive printer components; and these other attempts have included the use of "stand-alone" printers which serve as output devices for interchangeable use with different calculators. Such printers serve as optional peripheral output devices and do not form an integral part of the separate calculators. Thus, each calculator still has its own output section with redundant fluorescent tube or other display device. Further, because the printer does not form an integral part of the output or display section of each calculator, the electrical interface between the calculator and the stand-alone printer is complex, requiring many connecting signal lines. A large number of interfacing signal lines is undesirable because it increases the chance of interface signal transmission error and breakdown. Examples of such shared printer systems are the Hewlett Packard Model HP-41C and Texas Instruments Model PC-100C devices. In the PC-100C system, different independently-operable hand-held calculators can be interchangeably connected to the optional printer unit. The calculator and printer housings do not, however, combine to form an integral calculator housing.

The Monroe Model 2850 desk-top calculator system represents another attempt to increase the versatility of a calculator without duplication of components. In the Monroe system, a snap-in key module (having from four to eight function keys) and corresponding electrical calculation circuits, is provided on the keyboard for optional functions. Interchanging one snap-in module for another snap-in module removes one set of optional functions and associated function keys (including corresponding key identification symbols) and substitutes another. Consequently, the function and keyboard modification available with this Monroe system is quite limited. Also, the calculator input section is not separable from the output section. The Monroe 2850 type calculator system thus does not permit the keyboard section to be separated from the display section for user positioning convenience during operation or for desk-drawer storage.

SUMMARY OF THE INVENTION

The present invention overcomes the above and other drawbacks of conventional desk-top calculators. Thus, the invention provides the advantages of several different types of desk-top calculators without having to duplicate expensive output display devices, such as fluorescent tube displays and paper printers. This is achieved, according to the present invention, by novel arrangements wherein the display components of the calculator are arranged in a housing separate from that containing the keyboard and calculation circuits.

In one aspect of the invention, a modular calculator is provided in which input components, i.e. keyboard and calculation circuits, and output components, i.e. display devices, are housed in separate input and output housings; and novel means are provided which enable the input and output modules to be electrically connected and disconnected in a reliable and convenient manner.

The input module includes an input module housing containing a keyboard with data and function keys and electrical circuits for receiving data corresponding to operation of the data keys, for processing the data, i.e. performing calculations, according to operation of the function keys and for causing entered data as well as the results of the calculations to take the form of electrical signals suitable for serial transmission over a single wire to the output module.

The output module includes an output module housing containing a display device and electrical circuits for receiving the serially transmitted electrical signals from the input module and for operating the display device in accordance with those signals.

This arrangement provides great flexibility. For example, different input modules may be interchanged to provide calculators having different functional characteristics (such as basic arithmetic and scientific calculators), without the need for duplication of expensive display equipment. Conversely, different output modules (such as modules with standard and wide-carriage printers) may be interchanged with the same input section.

In the preferred embodiment of the invention, simple electrical interconnection between input and output modules is achieved by providing a microprocessor in the input module which organizes the processed data into electrical signals for serial transmission to the output module over a single data line to a microprocessor in the output module. In this embodiment, the input module microprocessor also organizes, for serial transmission to the output module, the electrical signals which control the format according to which data is to be displayed in the display device of the output module. The output module in the preferred embodiment also includes a microprocessor which receives both the processed data and the display format electrical signals from the input module and further processes these signals to control one or more display devices contained in the output module.

In another aspect of the invention a novel modular desk-top calculator is provided in which a keyboard module and a display module are provided in separate housings which have a releasable mechanical connection between them as well as a flexible electrical connection which allows them to be used as an integral calculator even when the housings are physically separated.

There have thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

BRIEF DESCRIPTION OF THE DRAWINGS

A selected embodiment of the invention has been chosen for purposes of illustration and description, and is shown in the accompanying drawings, forming a part of the specification, wherein:

FIG. 3 is a perspective view of the calculator of FIG. 1, with its modules separated;

FIG. 4 is a fragmentary perspective view of the input module of the calculator of FIG. 1, showing its electrical interconnection to the output module;

FIG. 5 is an enlarged fragmentary view, partially cut away, taken along the line 5—5 of FIG. 1;

FIG. 6 is a view similar to FIG. 5 but showing the input and output modules physically separated from each other;

FIG. 9 is a top view of an alternate output module for use in the calculator of FIG. 1;

DETAILED DESCRIPTION OF THE PREFERRED EMBODIMENT

Figure 1:
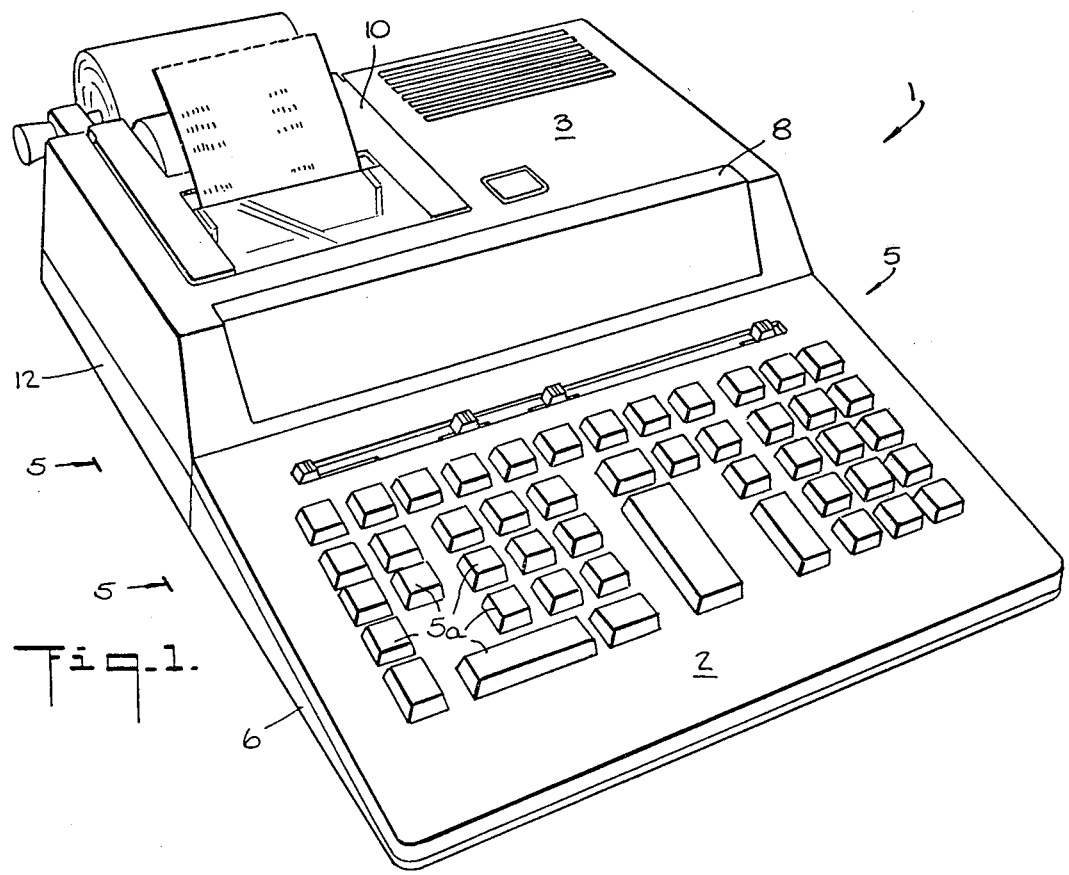
FIG. 1 is an overall perspective view of a calculator, having separable input and output modules, in which the present invention is embodied.
Figure 2:
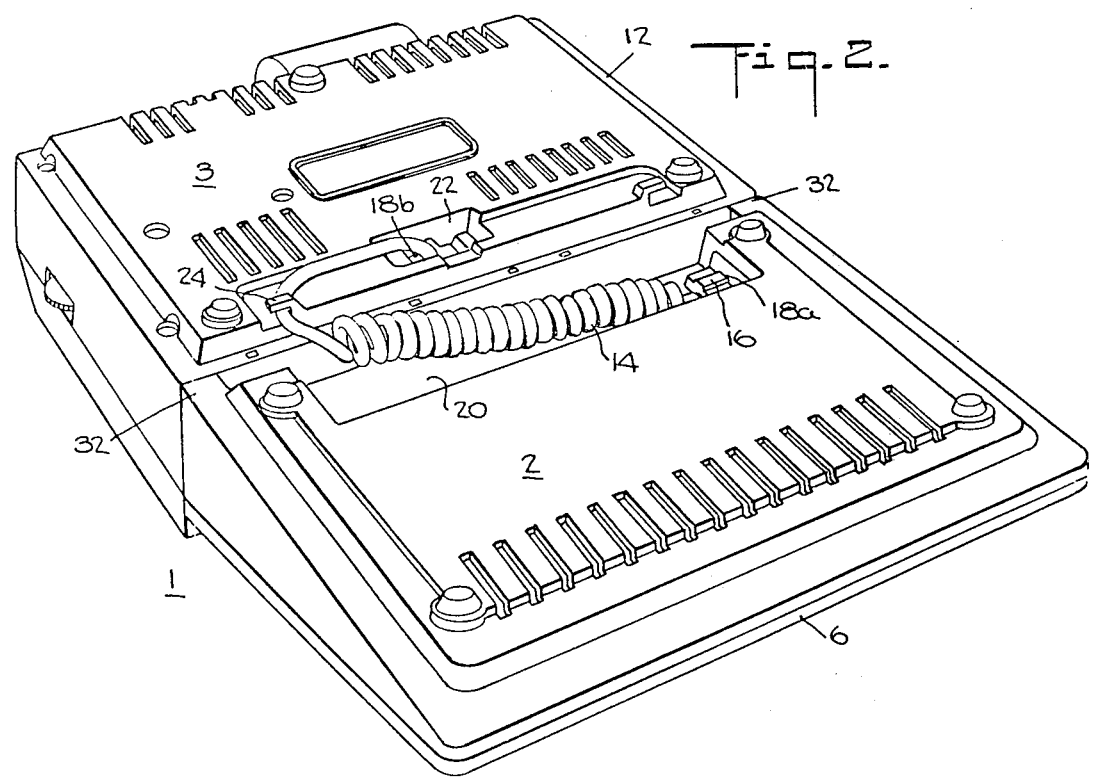
FIG. 2 is a perspective view showing the bottom of the calculator of FIG. 1.

As shown in FIGS. 1-3, a desktop calculator 1 embodying the principles of the invention, includes an input module 2 and an output module 3. The input module 2 has a standard calculator keyboard 5, containing depressable keys 5a, some of which are data keys and others of which are function keys, mounted on an input module housing 6. The output module 3 has display devices, including a fluorescent tube display 8, and a paper printer 10, mounted on an output module housing 12. The modules 2 and 3 each have electrical circuits (described below) that cooperate to form integral parts of the calculator 1.

An electrical signal cable 14, as shown in FIGS. 2-4, electrically interconnects the input and output modules 2 and 3. As such, the cable 14 electrically connects output terminals 18a of the input module 2 to input terminals 18b of the output module 3 (FIG. 2). A preferred electrical interconnection is achieved by use of a coiled cable 14 having snap-in male jacks 16 at each end that can readily be plugged into complementary female terminals 18 in each module in the manner illustrated in FIG. 4. A suitable cable connection may be selected from commercially available types, such as a cable with standard 8-pin jack connectors at each end. Such a cable resembles in appearance and operation the coiled cable with snap-in jacks that connects the dial and speaker portions of a modern telephone.

Preferably, the terminal outlets 18a and 18b which receive cable jacks 16 are respectively mounted in recesses 20 and 22 formed respectively in the input module housing 6 and the output module housing 12. Recesses 20 and 22 are shaped as shown in FIG. 2 to conceal the cable 14 from view when the modules are attached to each other as shown in FIG. 1. The terminals 18a and 18b are so located with respect to the recesses 20 and 22, and the cable guide 24 is so provided on housing 12, that a user may conveniently plug and unplug the cable jacks 16; yet the jacks 16 do not themselves pull out of the outlets 18a and 18b when the user separates the housings 6 and 12 to a position more comfortable for his work habits, such as shown in FIG. 3.

Suitable mechanical coupling means, such as illustrated in FIGS. 5 and 6, are provided for mechanically connecting the input module housing 6 removably to the output module housing 12. This permits the housings to be combined to form a unitary housing configuration as shown in FIG. 1. As shown in FIGS. 5 and 6, a flange 26 is formed on the input module housing 6 to extend downwardly from its upper surface at the edge thereof which abuts the output module housing 12. The output module housing 12, in turn is formed with an upwardly extending flange 28 which extends under the flange 26 to hold the housings together. As can be seen in FIGS. 5 and 6, the housings can be separated simply by lifting the input module housing 6 so that the flange 26 comes out of engagement with the flange 28. As shown, the flanges 26 and 28 are integrally molded as part of the housing structure of the modules 6 and 12. The flange 26 preferably extends across most of the rear of input module housing 6, while the flange 28 preferably extends across the width of housing 12 for a distance corresponding to the extent of flange 26. The input module 2 and output module 3 are mechanically connected by lowering the rear of input module housing 6 down onto the front of output module housing 12 so that flange 28 projects upwardly into the part of a recess 30 formed behind the flange 26 (FIG. 5). When the flanges 26 and 28 are brought together, the side portions 32 of housing 6 are brought into abutment with the sides of output housing 12, thereby concealing the mechanical connection from view in the resulting combined housing structure, as shown in FIG. 1. The dimensions of housings 6 and 12 are made the same at the points of abutment so that a single unitary calculator housing results that is visually pleasing.

With the preferred mechanical connection means described above, the combined housing structure can be lifted by lifting the output module housing 12. When so lifted, the lighter weight input housing 6 is supported by means of the flange connection to flange 28. Optionally, a suitable locking means (not shown) can be provided to further secure the mechanical connection. As described, the module 2 can be easily removed from the output module 3 by lifting the rear of the input module housing 6 upward relative to the front of module housing 12.

The calculator 1 with electrical and mechanical connecting means, as described above, can be operated either in a single combined calculator housing configuration with the housings 6 and 12 mechanically connected as shown in FIGS. 1 and 2, or it can be operated in a mechanically separated configuration with housings 6 and 12 separated as shown in FIG. 3. Operating the calculator as shown in FIG. 3 permits the user to position the input module 2 at any convenient location and orientation, independently of the location and orientation of the output module 3. This is especially advantageous in the embodiment shown since the paper printer 10 is quite heavy, while the input module 2 is much lighter.

The keyboard 5 of the input module 2 contains both data and function keys 5a. Optionally, as is known in the prior art, the keyboard may also include switches for controlling the calculator operating modes, such as decimal point positioning, etc.

Figure 7:
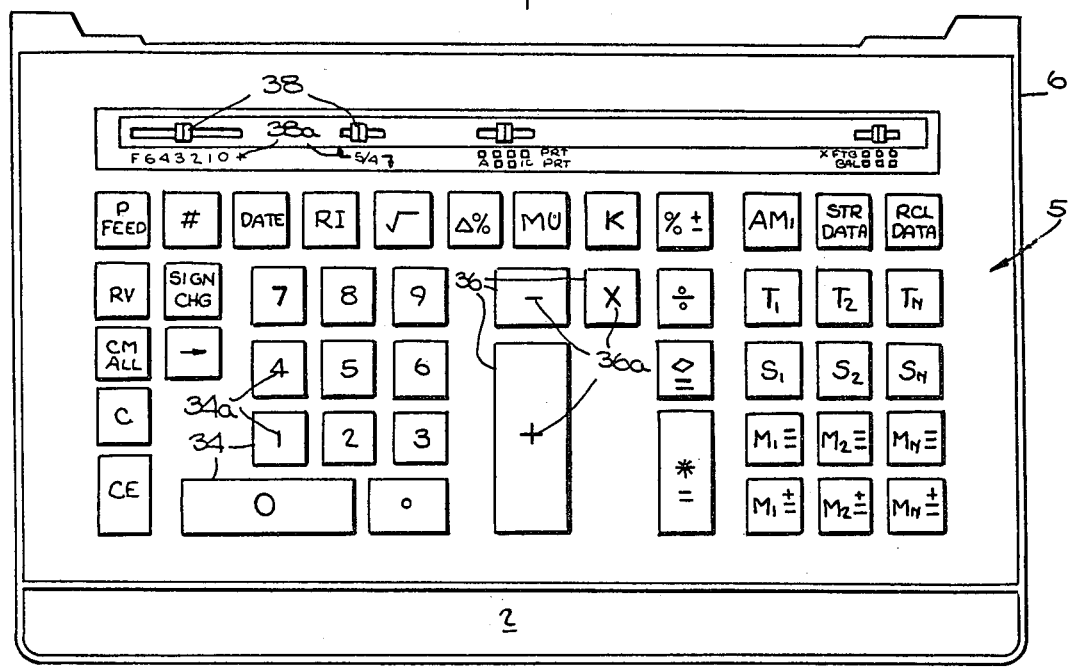
FIGS. 7 and 8 are top views of input modules having different keyboard layouts.

FIG. 7 shows an example of a keyboard layout for an input module 2 which provides basic arithmetic function operational capability. The keyboard layout of FIG. 7 includes data keys 34 which are identified by key top symbols 34a, such as the digits 0 to 9. The keyboard layout of FIG. 7 also includes function keys 36 which are identified by key top symbols 36a, such as +, −, × and ÷. Optional operational mode switches 38 are also provided. As shown, the switches 38 are slide switches and they are identified by symbols 38a corresponding to available switch positions. The input module 2 contains various electric circuits to carry out the functions identified by the keyboard function keys 36. The module 2 shown in FIG. 7 contains electrical circuits, such as a program ROM (read only memory) containing appropriate microinstructions, that control the calculator data processing for basic accounting functions initiated by operation of the function keys 36.

Figure 8:
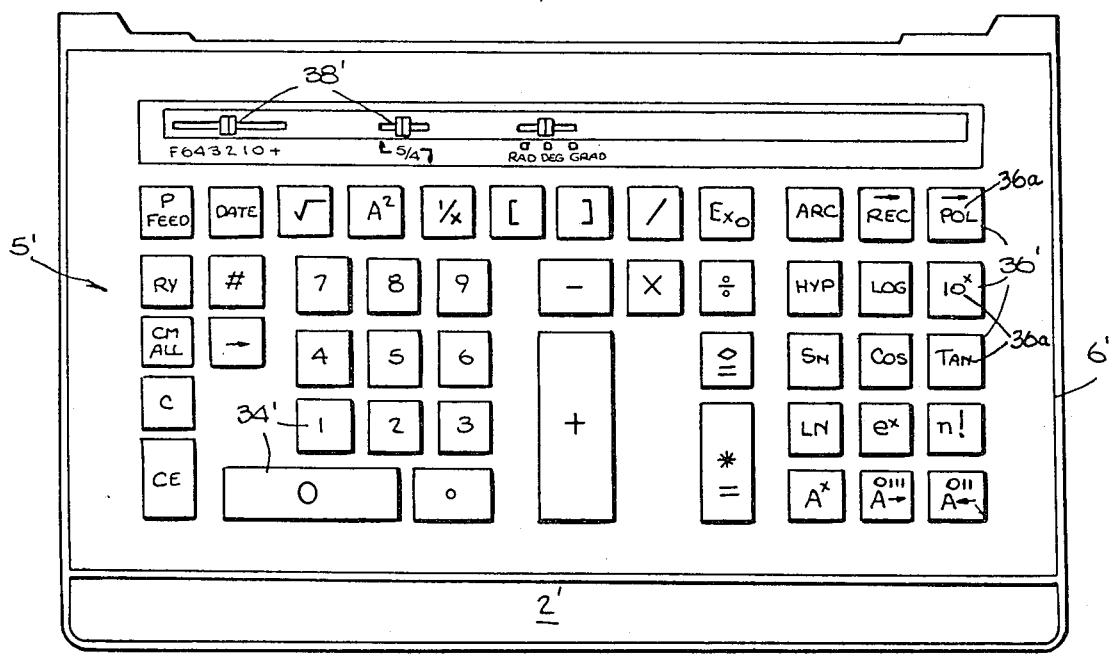

The modular construction of the calculator 1, wherein there are provided corresponding keyboard layout and calculator function control electronic circuits in the input module 2 and wherein the output display device is provided in the separate output module 3, is especially versatile. For example, this novel arrangement permits other input modules, having keyboards and electronics that define different function or calculation capabilities to be easily interchanged with the input module 2 shown in FIG. 1. Thus, the input module 2 (shown in FIG. 7), which has a keyboard layout and function control circuits for performing basic arithmetic operations, is interchangeable with a modified input module 2' (shown in FIG. 8), which has keyboard architecture and electronic circuits for performing scientific calculation functions.

The input module housing 6' is preferably shaped the same as the input module housing 6 and it includes a terminal 18a compatible with the jack 16 of the cable 14. The jack 16 can thus be unplugged from the input module housing 6 and plugged into input module housing 6'. This provides an appropriate electrical interface between the input module 2' and the output module 3 to convert the device to an integral scientific function calculator instead of a basic arithmetic function calculator. Replacing the basic input module 2 with the scientific input module 2' simultaneously changes the calculator program (i.e. the microinstructions, by adding a new program ROM) and also the corresponding keyboard. The added keyboard has function keys 36' whose tops are identified by symbols 36a' corresponding to the functions available with the added program. Also, additional switches 38' are provided to correspond to available selectable operational modes introduced by the scientific input module electrical circuits. Since the output components contribute most to the cost of a calculator, the use of interchangeable input modules enables the user to have both a basic and a scientific calculator at a minimal cost by eliminating duplication of equipment. The use of other input modules (such as alphanumeric keyboards, etc.) will be apparent to those skilled in the art.

It is possible, according to the present invention, to provide a plurality of different input modules for interchangeable use with the same output module, each different input module providing a different set of calculator function capabilities. Each input module contains appropriate electric circuits which define the module's function program. Each input module also contains appropriate keyboard architecture (including key identification symbols) that corresponds to its function program.

It is also possible with the present invention to utilize more than one type of output module with the same input module. For example, a wide-carriage paper printer can be provided for other applications. A plurality of interchangeable output modules also can be provided for this purpose. For example, as shown in FIG. 9, an output module 3' having a wide-carriage printer display device 10' can be substituted for output module 3 of FIG. 1. In this way, the same group of input modules 2, 2', etc., can each be used with the output module 3' in the same way that each input module 2, 2', etc. can be used with the output module 3, as already described. The modular calculator system of this invention makes possible the later addition of newly developed modules to an existing system.

Figure 11:
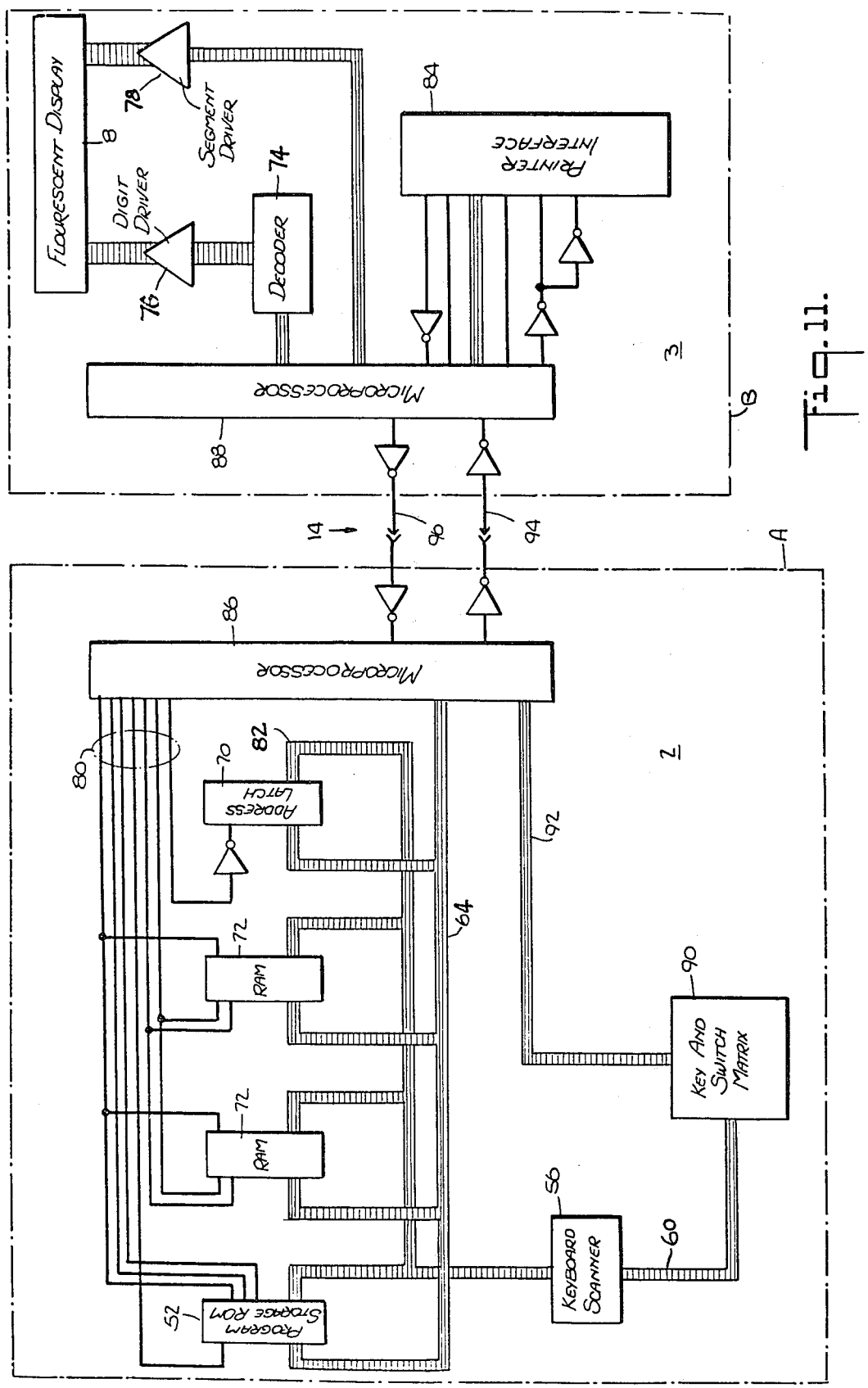
FIG. 11 is a block diagram of the electrical circuits used in the calculator of FIG. 1.

FIG. 11 illustrates the electrical circuits of the input and output modules 2 and 3 of the calculator 1. The circuits housed in the input module 2 are shown in the dot-and-dash rectangle A on the left side of FIG. 11 and the circuits housed in the output module 3 are shown in the dot-and-dash rectangle B on the right side of FIG. 11. The input module electrical circuits control keyboard supervision and function control operations. The output module electrical circuits control display device driving operations.

In the preferred circuit configuration for use in the calculator of FIG. 1, the input module circuits not only control each function operation (as by means of an instruction ROM) but also perform all other data processing operations, including the formatting of the output data, i.e. specifying how it is to be arranged for presentation in the display. The formatted output data is transmitted over cable 14 to the electrical circuits of output module 3 which control the display of the output data onto the fluorescent tube display 8 and/or the paper printer 10 (see FIG. 1). The inclusion of the control circuits for data processing operations in addition to those of keyboard supervision and function control permits the simplification of the electrical interface between the input and output modules. As the circuits are further described, it will be apparent to those skilled in the art that the circuits to control some of these other calculator operations can be differently allocated between the modules.

Figure 10:
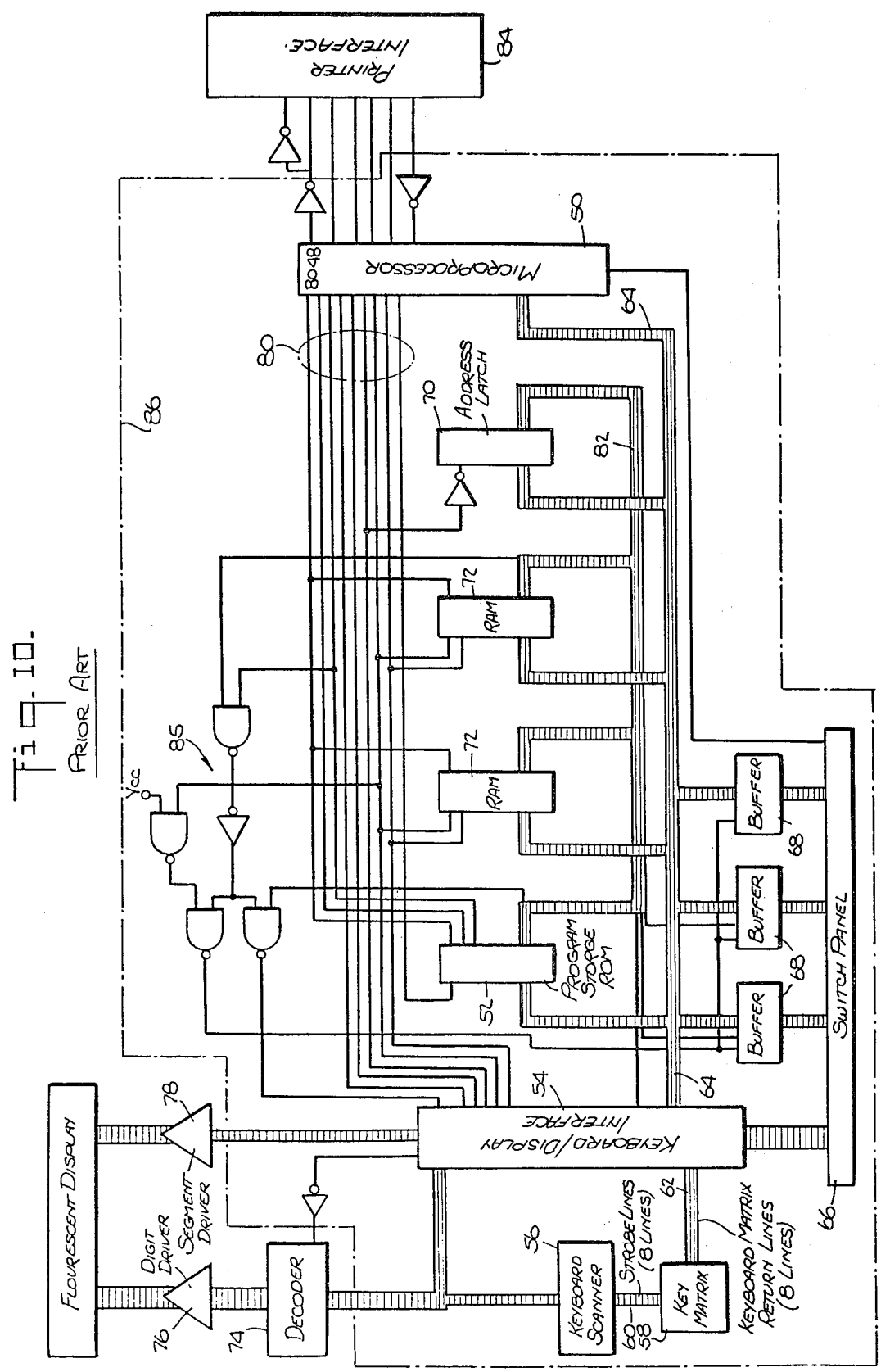
FIG. 10 is a block diagram of the electrical circuits of a prior art calculator.

In order to more clearly present the electrical connection between the modules in accordance with the invention, a description of typical circuit arrangements for a prior art calculator is presented herein in connection with the diagram of FIG. 10.

As shown in FIG. 10, a microprocessor or microcomputer 50 performs all calculator operations. The program instructions controlling the operation of microprocessor 50 and defining the function capabilities of the calculator are either stored on-board, i.e. in the internal program ROM of the microprocessor itself, or they are stored externally in a separate program storage ROM 52 which is in constant electrical communication through data, address and control buses with the microprocessor 50.

A keyboard/display interface device 54 handles routine display driving and keyboard scanning functions. Keyboard scanning is accomplished by electrical connection of interface device 54 with a keyboard scanner 56 and a key matrix 58. Electrical signals are sent to key matrix 58 from keyboard scanner 56 by means of strobe lines 60 and, when a key is operated (i.e. pressed down by the user), these signals are returned to the interface device 54 by means of return lines 62. Electrical signals that identify which data key or function key has been depressed are transmitted from the interface device 54 over a bi-directional data bus 64 to the microprocessor 50. The keyboard/display interface device 54 is also electrically connected to optional operating mode switches in switch panel 66 and switch latch buffers 68. Electrical signals that identify the switch positions of the switches 38 (FIG. 7) of switch panel 66 are communicated from buffers 68 to the microprocessor 50 over the bus 64.

The microprocessor 50 processes information received from the data keys 34 in accordance with the operation of the function keys 36 (FIG. 7) under the control of the microinstructions stored on-board and/or in external program storage ROM 52, utilizing peripheral components such as an address latch 70. External Random Access Memories (RAM's) 72 are utilized to increase the data storage capability of microprocessor 50. Microprocessor 50 sends electrical signals representing data to be displayed at a display device, such as the fluorescent tube display 8, to the keyboard/display interface device 54 which preforms local control for driving of the tube display through electrical connection with a decoder 74, digit drivers 76 and a segment driver 78. The microprocessor 50 can also selectively send output data signals to a printer 10 which connects to a printer interface device 84. Electrical communication between the various elements and the microprocessor 50 is handled by means of the data bus 64, a control bus 80 and an address bus 82, all connected in a conventional manner. Digital logic, such as NAND gates 85, controls various switching, chip enabling and other operations in a known way.

If the fluorescent display 8 and printer 10 components of a conventional calculator, whose electrical system is shown in FIG. 10, were to be separated from the keyboard and data processing components, the separation of the electrical circuits would be as shown by the dot-and-dash polygon 86 in FIG. 10. Those skilled in the calculator art can appreciate that a large number of signal lines would be required for an electrical interface between those electric circuits inside polygon 86 and those outside it. For example, a typical conventional eight-bit microcomputer data processing system would require a four-line interface between the decoder 74 and the keyboard/display interface device 54; an eight-line interface between the segment driver 78 and the interface device 54; and about a twenty-line interface between the microprocessor 50 and printer interface device 84. In other words, if the conventional circuit arrangement illustrated in FIG. 10 were to be separated into input and output components, more than thirty signal lines plus appropriate power and ground lines would be needed to provide interfacing between the two sections.

The electric circuits of the present invention provide an electrical connection between the input module 2 and the output module 3 having only two signal lines along with appropriate power and ground lines.

FIG. 11 shows the preferred circuits for the calculator 1 of FIG. 1. Elements serving the same purpose in the circuits of FIG. 11 as those in the prior art circuits of FIG. 10 are given the same reference numerals. The input module 2 (indicated by the dot-and-dash rectangle A on the left of FIG. 11) houses the key and switch supervision circuits, the function defining circuits and the data processing circuits. The fluorescent display circuits, the printer interface circuits and the output display supervision circuits are housed in the output module 3 (indicated by the dot-and-dash rectangle B on the right of FIG. 11). Electrical connecting means 14 provides an electrical interface between the modules.

The data processing operations for the calculator are performed by an input module microprocessor 86, such as, for example, a commercially available 8-bit single chip 8048 microcomputer. Since display drive and printer interface functions are controlled by output module circuits, the input module microprocessor 86 is connected to control all supervision (even local supervision) of the data keys 34, function keys 36 and switches 38 (FIG. 7) by connection to keyboard scanner 56 and key and switch matrix 90. Microprocessor 86 thus carries out the keyboard scan operations which are performed by the keyboard/display interface device 54 in the prior art circuit configuration of FIG. 10. Further, since microprocessor 86 can monitor multiple key closures, switch closure detection for switches 38 (FIG. 7) is supervised in the same manner as key closures, and not by means of separate switch latches 68 as in FIG. 10. Signals corresponding to key closures on the key and switch matrix 90 are sent to the microprocessor 86 by return lines 92. The microprocessor 86 thereafter acts on this information under the control of microinstructions stored on an on-board program ROM and/or an external program storage ROM 52, utilizing peripheral devices such as address latch 70 and RAM's 72. The preferred circuit uses an external program storage ROM, such as an 8332 4-K byte mask programmed ROM, while disabling the on-board program ROM of the microprocessor 86. The mask of the external program ROM defines what functions will be available to the user of the particular input module 2. A change from one input module 2 (FIG. 7) to another input module 2' (FIG. 8) changes both the keyboard architecture (including function key identification symbols) and the function-defining program stored in the external program ROM 52.

The input module microprocessor 86 receives data signals corresponding to operation of data keys 34 through the key and switch matrix 90 and processes the data in accordance with information received from the operation of the function keys 36 and the settings of switches 38 also received through the key and switch matrix 90. The processing is under the control of the microprogram stored in the program ROM 52. The microprocessor 86 then formats output data signals and transmits them in series along a single data line 94 to an output module microprocessor 88 housed in the output module 3. Microprocessor 88 supervises the driving of display 8 and the operation of the printer 10 through a printer interface device 84 in accordance with the output data and output format information received on data signal line 94 from microprocessor 86 in the input module 2. A signal line 96 serves for reply communications between the microprocessors 86 and 88.

The preferred microprocessor 88 usable in the electrical circuits of output module 3 is also an 8-bit single chip 8048 microcomputer. In the output module 3, the program control for the microprocessor 88 is provided by the internal ROM located on-board the microprocessor chip 88 itself. Providing the microprogram for the input module microprocessor 86 externally and the microprogram for the output module microprocessor 88 internally is advantageous because it permits the identical 8048 LSI chip component to be used for both microprocessors 86 and 88. The 8048 factory-programmed mask is used for program control in the output module, but is disabled in the input module. Typical program specifications for a preferred 8332 program instruction ROM available from the company, Electronic Arrays, to control the input module circuits and for a preferred 8048 microcomputer available from NEC (Nippon Electric Company Limited) to control output module circuits are shown below in Tables 1 and 2.

TABLE 1. MICROINSTRUCTION PROGRAM SPECIFICATION FOR A PREFERRED ELECTRONIC ARRAYS 8332 PROGRAM STORAGE ROM

E.A. DEVICE NUMBER: EA8332A

CHIP SELECT PROGRAMMING

C51 (PIN 20) SELECTED BY LOGIC 0 LEVEL (LOW)
C52 (PIN 21) SELECTED BY LOGIC 1 LEVEL (HIGH)
INTEL HEX FORMAT:

```
:10000000027F5849343B8B3D5ACFF7216C639923343
:10001000BF008A800439FE77AEF22ECF9A7F04911A
:100020000983098309830983098309830983CF8AA3
:1000300080049186370439861BFDF29103D0ADFA16
:10004000C64CF814043753A9663299691BA0718F8E3
:100050005307C64EA81404A9F81404493796B7EA32
:10006000A4E0491F8F2914380280747779A9FA19675F
:10007000E66EFB72914308ABF291030F53F72B53DB
:10008000074338329A10491BA802AE72A67E689B98B
:100090000055237FE621DFF53802C93B81BF053F0D4
:1000A00096C0F072D1F5B801B403E5F29BBCFF3401
:1000B0007AB9C0E8B3E9B304A5202242632A2C63
:1000C0004760530743A3A9272107ABF003F0A0FB93
:1000D0008353F7A5B59704CEBCA19475BCD99475BC
:1000E000347314F4149BE6E2FB03F153FEC6F1767D
```

```
:1000F000E4F50406B830FDD320C6FDB828BB01B92D
:10010000081C60B94EF3753109228B92FBA0E8195
:10011000C614BB04C9EA0FBA4081C9961E81C9033F
:10012000FFFAF7AAE619F747762C53EF40472B94CE
:10013000DF01737530FAAF80307A885B908F05335
:10014000F09645EA48FB246DFBBBA0724FBBB05351
:10015000F7246EF0C8B66E530F965DEA604B246DBF
:10016000F053F0966923BBEA6EFB4743B095940DBC
:10017000E95383BCFF94F3127A83947A2480948E9B
:10018000FC1CA396878451AA53F0D3C0967EB8284E
:10019000FAA3A9D34B9699B82074542480B4DD14E3
:1001A000FB2475FD32B53712B4E80280173792B40C
:1001B000B8281010FD820000000000000000000BF
:1001C000039B943474B16C37300160077C373001940
:1001D000C37300190077C37300C200C2390019C28B
:1001E0006D008A19008AE100C0AB00C1A800C06E92
:1001F00000C1A869C400C0AB69C4007A6085C4000E
:100200000000000000434C4541D220414CCC204F56C9
:100210004552464C4FD7535542544F5441CC434F0F
:100220004C554DCE42414C414E43C5204D4F44C5E7
:10023000495445CD4C494E459E2020434F4C2E9A63
:100240002520444953434F554ED4252041444452052
:100250004FCE524556455253C5204D41524B205525
:10026000D053512E524F4FD40DA02020FE2020AA53
:100270002A4D9020204D90693D96200420454E54F3
:1002800052590420E720042002AE4752414E44A0B3
:10029000E060E143414C43554C4154494F4EE967BF
:1002A000E8A025BDA0254BBD20ADFD20ABFCFB2D5E
:1002B000EEA52BEE7D4BBD4B7CBD2053C42052C41C
:1002C000582D464F4F54414745860204D454D4F0E
:1002D0005259E1662046554CCCE34D10E26AE26C7F
:1002E000E265E267E2EA692B9A692D9A693D9A0F05
:1002F000AD6D7FFD6D7FFC699A206D20AAFAA397F2
:10030000E767834A414E4645424D41524150524D66
:1003100041594A554E4A554C41547535045074F4314
:10032000544E4F564443B9077442FB03ED27F63C
:1003300038FB9236643803FA7440743FFC91C9FB71
:1003400091C927ABACB4EE57F651B802BA02D46BE0
:1003500027C64583FBD25BF903FBA9F00381530F4A
:10036000AA2314073268071 9EA632A67F26F19494A
:10037000A9F84307A885A7F0B67647530FE6DC969C
:1003800089CAFA32EDEAEC1A1AFB533FC6B3F9B246
:10039000A0376B37B2A0F777531FC6A0F6A464C688
:1003A000230A940D230D940D23032BD2AECB53407F
:1003B0002B940DF937F2BFFB4380AB230E940DF95C
:1003C000B2CD531FC6CDA92320940CE9C9F853F828
:1003D000A9F137F2D9232D940C976477940ACAFABD
:1003E000F2EE32EE232CEAEA232E940C191995B67C
:1003F00077C8F8530796778374FC64FE97A7C88084
:1004000047940480530FE60AC61B43301BD567533D
:100410007F4CF20FF7AEBFD0BC80C583947AFCD27C
:1004200045B22F92454320AC67A71309A3948DB81A
:10043000028B947FCD3A8C63DFCD3AF963FB9C774D3
:10044000542320940CFCD3E9964E230E940DFC9477
:100450008D230A940D230D840D40615A4A00F752F2
:1004600004090D0E16191E242B3034393B6875FE15
:10047000F2751C1C94F3121C83BB40B80080B89E
:1004800003968A8037D28ABB00C8F8840DAA54FD2F
```

```
:10049000D2C3B2C592ABE7A8FBD2A1F803FBE6A199
:1004A000A8181A54FD940CE8A584D372BC52B6FE69
:1004B000530F940A84D3FE530FE7031EA874F8F673
:1004C000B284D3B2C9940C84D392C52AA9FAA39456
:1004D0008DF9AA54FD1AE68E8300000000000000803A
:1004E0000000B81880961BB81CB45DBCE58475B9D3
:1004F000038183B8018083B487B83823AAA48AFD16
:10050000C60A94EFBC90B878920EBC91B81E2790A2
:1005100018F8960E83FD53BFA423FD92237820F
:10052000053BF3737F22843503753F643022D83B871
:10053000188B8803077A977768690747773A9B7
:100540001983FE530F77470330A983FE530FE70348
:100550001CA883B818279018901883B81897A7B4C8
:100560006218801300579083B91ABA02A4E7B91A27
:10057000BA02A4D4FE37F27EB82820D3802083B8F4
:1005800023A489B838A489B83027BA03C3A0EA8C4A
:1005900083B830A4A1B838A49BB830B928A4A9B8AE
:1005A00028B938A4A9B838B930BA08C8C9F0A1EA3E
:1005B000AB83B828A4B8B828B930BA08C8C9202164
:1005C00020EABC83BCF99475BD02B4DBB483B910D6
:1005D000B838BA08C8C9F091EAD483B910B830A4C1
:1005E000E5B910B838BA08C8C981A0EAE78327037B
:1005F000D0B82FBA08C46B9475B928B4FDF10303C1
:1006000011924983D406B82827D461C617D4513033
:100610009615B5230E073083D449AAF1530F376BD3
:10062000037C62BE618D45DC61BD44EF1530FAB83EF
:10063000D487FAC64803B094F33792A8B240E648EC
:1006400019F1030157A1F64083F90307A8273107E1
:1006500031BA07C45627204730C8EA5683F9A8277D
:1006600011BA07C46B1BB828BA0F2718304720EA05
:100670006B83D4A8D4C2762FB837BA07F09683C854
:10068000EA7CA0B930C489B92885BA00B80280AB29
:10069000003F2E61BC69ABB02C41B95F1530FC62B8F
:1006A000D449C69BD460C42BD48795B6BAACD48346
:1006B000376CE6B6FCABB928D41BB930D41BB928CB
:1006C000C41BFEB830B928BA07D0D1F2E0F48EE6E8
:1006D000DF2310D451273003FFF6DE030EB530833D
:1006E000F49EE6F7B830F0D380A0BA0797182365D8
:1006F000703757A0A7EAED83B483B820B928ABBC04
:10070000E21030D83FED232D4F86021B837BA0F20
:10071000D455C61C472B21F480EB1721EC0C210784
:1007200002BD465FBE703B0F62EF053F0C621B4B22C
:10073000E46AFDF237B4B6D4F83760372BBA08183C
:10074000F0964BEA3FB487231AE46B8595D465E4B1
:1007500054191185B82FB920BA08F49EE651F480D7
:10076000FBF7D351C66AB64DEC4DFB2B53802B5390
:100770007F03E5F67AB5030E530F4BA17604C49BB5
:10078000B82FB920BA08E48EFBAAB82FB92797185A
:100790001920715720EA8F83FBAAB82FB927971821
:1007A0001923657137605A70A7EA9F83B483ABB85C
:1007B0002820B5F2B6A5530F03F3A767ACF6E0B84F
:1007C00028BA08D46A1BF498F6D8B82810F498E62A
:1007D000C6F488B828F007A0F488FBAAB827D46A22
:1007E000BA08FB72EF1B1A271820EAE81CE4C6FCC3
:1007F000D30DC6F7F0C6E8B827D46AFCB828A083A2
:10080000891EBDC657ABB416352E53402EFB03F090
:100810000E618961684AF6416E50306E658B3947A94
:1008200023239400232094DDB828FD123BD320964A
```

```
:10083000033B830B92D7454945104E4B41BF037F23A
:100840004523ØE94ØDB4EE5747E651C645123723A3
:10085000FE0330940DE64595FD1260B416CD94F775
:10086000B828B681F0530FD30DC6B0B92FF153F0AD
:1008700096B0FD37327710FB47D461FB47B4F104E3
:10088000E2FD4302AD2730E87BFD3712B0B837BA3E
:100890000823A0D456D3E0C68DB82F27D4512730D3
:1008A000C6A6073004E2B415CD04E2FD76BA12B252
:1008B0004E494F7B41AFDD2BACDA504E2FD5303C3
:1008C000C6B0B47804E2FD3712D0B41A7427B487E6
:1008D000947AB80780C6E8BA03A9E769A9F919E3C9
:1008E000940CEADD232E940C74FCF6FAC88096F37F
:1008F000C8801818C6FA232C940C74F8945104E29A
:10090000AB07C648171B44149BE60FD31AC6110445
:10091000E6B40CBCCA04DE2E43802EFD1224322421
:10092000923BB4C4BCAA946FFD532443102DF237FC
:10093000379237F40576E7B499EA3FBCF1946FFE3D
:1009400077AE04E2FED2C49594F3724FFDF26BFDD4
:10095000F256BC82926DB6C4532443022D531396B3
:1009600063B4C4BCB1B4F7D49B04E2BC8553B443B4
:100970002B67943082C43202C2DB4F7FD729DB4A8
:1009800078B483B83110D4A827D4C3B4A5B49FB920
:10099000F9B4D0F435B9F9B4E3B495EA9FF405FDA0
:1009A000532FB2A64390AD76E796BCFD12B432B495
:1009B00092C4B4C4B415BC839475F4ACD43076E757
:1009C000BCA1947504E2FDD32096C4BD42B499B491
:1009D000CABCAE9475F43776DFD40476DFD430BC6D
:1009E000B176E504DE04DAFD53F7F2F453EF434247
:1009F000B2F453BFAD04D837B3E503F9E6F792C4B8
:100A00000032C9258B3B918B4DDBCBD9475B4150469
:100A1000E2FD121AD320961CC61EB41BB491B9185D
:100A2000B4D0B4B2BCBA9475B4B204E43CB8051105
:100A3000018111910282129200801090FDF22A929F
:100A4000049D320962ABD6204E2B429FEBC8AD25260
:100A5000BC8D9475B4B604E2A312753275AC149BC8
:100A6000E671C67103F6E673D3149671FC432192C6
:100A70007504E6FB4C4EAE9281F564E4031792AF29
:100A80001EBCCFF287BCC594F3375306C6941C1C1A
:100A90001C1C3475B442B4DD3475FE37F2AAB4833D
:100AA000B442B4D0B44BB455347314FBFEB27CFDE5
:100AB0009264434ØB41B04E4B41A12C8BCEC94755D
:100AC000B487B82BB46804E2FD43042DB2D252D2ED
:100AD000B453B491B9F9B4D0B928BB00D41BB8331E
:100AE000B489B483B83310B468D4C2B82BB46EC818
:100AF000F0BCE9F2F7BCE69475B833B46EB9F9B45A
:100B0000DD04E20000000000000000000000000022
:100B10000000000000B30080C61DA43DFB03EBF0
:100B2000E62824F9102090030E50328A34EAEB2CF7A
:100B3000FD72AEFE37923EFDB23F523FB453FDF21E
:100B400079BCA3928834A3537FADFE530FC652F5F0
:100B50008443FD5257B45BB4E1D472FDB261FEB27E
:100B60006EBCA894F3526CFD526CBC88946FB4CEEA
:100B700076A8FEB2EABD2004E2924A94F37245BC24
:100B8000B4FE9245D288BCB79475F4057697D430FC
:100B9000FD53EF43809649FD53244342ADB2A6FE78
:100BA00092A6FD4380AD04D8B4CABD4204D853B761
```

```
:100BB000ADB49FD472B4A5BC81946F76BF04E2FD3E
:100BC000F2C54340AD04DCFD537FADB487C6F69259
:100BD000DDFDB2DD37D2E4F2CB94F372C7FD53F3FF
:100BE000D362C6EAE5FDD3209633B4DBFE92FBB4B4
:100BF000CCFE530F96FB94F3D2FB1E14FBFD53FB6C
:100C0000AD94F337123BAC947AFEBA169214BA192B
:100C1000FD37B223948EFC5306C6239451947ABABE
:100C2000EC948EBC6BFE9239BC6E530FC639BC700F
:100C3000FEB239BCAFF239BCB2942FFE4320AE53A2
:100C4000FC663E5B442B4E3D472FEB25314FBBCE6
:100C5000AF946F765FB442B4D0B44BB45DE863BC7C
:100C6000DA9475FE92F1B2F9FDB2EF72F737F27FC6
:100C7000927F04E0537FAD94EFB27FBCEF9475FD9B
:100C8000538443A2ADF28D768DFE37B2F704E00017
:100C9000000000B83FA0E8959AFE90E89A8AFF907D
:100CA000E89F62B41632A9E4BF2555E514FBF5B8F8
:100CB0000B403E580293790B6C4D996C48096D78E
:100CC000BC90C6D9347388080BCC032D3BC9F126C
:100CD000D3BC939475347394FFA5B487B483B4CE16
:100CE000B47FB453B455B455BD42AE04DE000072B7
:100CF000F4FD53044362AD04E2FDB274B453C67F05
:100D0000100E12B414A9B41429D99606F9830983D4
:100D10009830983F8B3B801B4039018B403BA0780
:100D200097F2251A1AD2281ACAF7F628FA530F9002
:100D3000180A5370263717463B171790832B03EB7F
:100D40002B324AE5F648124C04E4C400FB0354B3CA
:100D500058C854AF2E43802E34A3BD20B262BCFBD2
:100D60003475B49FD472B495BCF1FEF26FBCF63406
:100D7000075BCE376EAFE37D2AAB980B4E3D472B97F
:100D8000080B4D076861EA5B988FE472EF290B99021
:100D9000B4E3D472B988FE47AEF29DB990B4D07670
:100DA000A4FE12AABCD9947576D6FDB2C496CEFD27
:100DB000B24834A3BD20BE40BCFB3475D487B4997F
:100DC000BCFD3475B49F04E234A3BD42125CFE370F
:100DD000D2E8BCD33475BCE8B990349DBCEBB9887B
:100DE000349DBCEEB980349DBCEF9475B483B9904A
:100DF000B4D0B4D0B4D0B487B4B6BD42BE0004E021
:100E0000E5FBE60AD309C69304E40311B3135E11AC
:100E10008BE8034A3BD2094EFBAE9921FBAD8B8B7
:100E2000188906AF65494E2B45BB4E1D472B474BC32
:100E3000DB3475B474BCDD76D7B42FB4E3D472BCA4
:100E4000DF76D7B42FB4D0B4E1D472B4CEFDD320C2
:100E5000966604E2BCD39475B487BD6204E234A301
:100E6000BD10121794E2B81880AAB81A80376AE643
:100E700073FA90B4DBB483B4CEBCDE3475B49FD4C3
:100E800072B495BCEF9475B453768EFD925C347356
:100E9000027C6A934A3BD421217B2669687B45BB4C5
:100EA0002FB4DD14FBBCDB3475B81A80AAB81880E7
:100EB000DA969DB487B4B676CDBCE23475BCD9342D
:100EC00075B402B453B455B455BCEF04DEBCE5347C
:100ED00075BCD9BD4276BFBD629475B4A5BCD9348A
:100EE0007504E000000000000000000000000000A9
:100EF00000000000000000000000000000000000F2
:100F000000000000000000000000000000000000E1
:100F100000000000000000000000000000000000D1
:100F200000000000000000000000000000000000C1
:100F300000000000000000000000000000000000B1
```

```
:100F4000000000000000000000000000000000A1
:100F5000000000000000000000000000000000091
:100F6000000000000000000000000000000000081
:100F7000000000000000000000000000000000071
:100F8000000000000000000000000000000000061
:100F9000000000000000000000000000000000051
:100FA000000000000000000000000000000000041
:100FB00000000000000000000000000000000270A
:100FC000A8A9AAF99017E8C42B80DB4AAA2B17E836
:100FD000C8E9C3FAC6E003F0E6FA530FC6DCE4DE64
:100FE000E8E0E8E2E8E4E8E6E8E8E8EAE8ECE8EE89
:100FF000E8F0E8F286FC9A7FE4E0E6FA8AFFE4E0B3
:00000001
```

END            CHECKSUM: B6AA

TABLE 2. MICROINSTRUCTION PROGRAM SPECIFICATION FOR A PREFERRED NEC 8048 MICROCOMPUTER

| ADDRESS | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 000 | E5 | 04 | CA | D5 | 86 | 99 | 93 | D5 | 97 | 2F | 76 | 19 | BE | FE | 23 | FD |
| 010 | 62 | 23 | 7F | 56 | 3E | 2F | 55 | B5 | 93 | 46 | 26 | 97 | A7 | 67 | E6 | 28 |
| 020 | 2F | 2E | 62 | 55 | 2E | 93 | 04 | 1D | 8A | 80 | AE | FA | B3 | 30 | 67 | 73 |
| 030 | EE | 48 | B9 | 05 | 23 | BF | 51 | A1 | 54 | 07 | BB | 08 | BA | 2E | 23 | FF |
| 040 | 62 | 25 | 45 | A5 | 2F | 9A | 7F | 93 | EE | 50 | BB | 0C | 23 | 25 | 04 | 56 |
| 050 | EE | 5F | BB | 0A | 23 | 20 | A8 | AC | BE | 08 | FE | 74 | 00 | 04 | 87 | EE |
| 060 | 6F | 23 | 40 | 74 | 00 | 04 | 38 | FB | 03 | 0F | A9 | FE | A1 | EB | 3C | BA |
| 070 | 2D | 04 | 3E | FE | A0 | 03 | F3 | C6 | 8B | 03 | 03 | BE | 02 | C6 | 5A | 03 |
| 080 | FC | BE | 04 | C6 | 5A | 74 | 05 | BA | 2F | 04 | 3E | 23 | 01 | 74 | 00 | FC |
| 090 | A8 | FB | AE | BB | 0A | 65 | 35 | 2F | 93 | 2D | 02 | 15 | EB | A6 | 74 | 05 |
| 0A0 | D2 | C6 | FE | AB | 04 | BA | 76 | BA | FB | 72 | AD | 44 | 14 | 07 | 72 | BE |
| 0B0 | F0 | 53 | 1F | AC | 47 | 77 | 37 | 6C | 17 | AC | 23 | 7F | 2D | 93 | 07 | 72 |
| 0C0 | BA | F0 | D3 | 0D | 96 | BA | A5 | B5 | 04 | BA | BD | 00 | D5 | 54 | 07 | 14 |
| 0D0 | BA | 14 | 6F | C5 | BC | 28 | 15 | 23 | 7F | 02 | 02 | BB | 03 | 74 | 0F | EB |
| 0E0 | DD | 1B | 34 | A9 | 96 | E2 | 07 | C6 | FB | 86 | E6 | 34 | A9 | 96 | EB | EB |
| 0F0 | F6 | 34 | 1F | C6 | FF | 27 | 86 | E2 | 07 | 96 | F6 | 23 | 80 | 4D | AD | 15 |

| ADDRESS | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 100 | 23 | FF | 02 | 02 | 74 | 0F | FD | 12 | 0F | 72 | 04 | 36 | 04 | 04 | D4 | F2 |
| 110 | 15 | BC | 21 | 04 | D6 | FD | 53 | C0 | AD | D5 | 14 | 6F | C5 | 24 | 04 | FC |
| 120 | B3 | 30 | 37 | 41 | 4B | 51 | 64 | 72 | 79 | 84 | 8C | 90 | 94 | 9C | A3 | 8A |
| 130 | 1C | FD | 37 | 52 | 37 | 9A | DF | 8A | 40 | 0A | D2 | 3E | 1B | 83 | A5 | 24 |
| 140 | 43 | EE | 48 | 8A | 20 | BE | 9C | 1C | 1B | 05 | 83 | EE | 48 | BB | 0C | 1C |
| 150 | 83 | FD | 37 | 32 | 57 | 9A | EF | FD | 53 | 40 | AD | D5 | 14 | 6F | C5 | FC |
| 160 | BB | 46 | 1C | 83 | 8A | 10 | FD | 37 | 72 | 6E | 23 | 01 | 4D | AD | BB | 2C |
| 170 | 1C | 83 | BC | 20 | FD | 12 | 4D | 27 | 83 | 8A | 40 | 0A | D2 | 80 | 1B | 83 |
| 180 | BB | E6 | 1C | 83 | 8A | 10 | BB | 5C | 1C | 83 | BC | 28 | 9A | EF | 24 | 60 |
| 190 | 9A | 10 | 24 | 6E | 26 | 40 | FD | 52 | 7F | AC | 27 | 83 | 8A | 40 | 0A | 02 |
| 1A0 | 3C | 1B | 83 | 8A | 10 | BB | 5A | 1C | 83 | 0A | 17 | 53 | 0F | C6 | EB | A9 |
| 1B0 | 17 | 99 | 00 | 8A | 0F | 92 | EA | 77 | 02 | 8F | 29 | 72 | BF | 9A | F7 | 52 |
| 1C0 | C3 | 9A | FE | 32 | C7 | 9A | FD | 12 | CB | 9A | FE | F1 | E5 | CF | 47 | 52 |
| 1D0 | 0F | 03 | 14 | E3 | 39 | 53 | 37 | C6 | E3 | FA | 03 | 10 | E6 | E8 | 12 | E4 |
| 1E0 | 89 | 40 | 24 | E6 | 89 | 80 | 23 | D1 | AA | 27 | 83 | B9 | 17 | 9A | F0 | F1 |
| 1F0 | 52 | 0F | 39 | FD | 37 | F2 | F9 | 89 | 10 | D2 | FD | 89 | 20 | F1 | 27 | 52 |

| ADDRESS | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 200 | F0 | 24 | E8 | 00 | 00 | 00 | 00 | B9 | 17 | B1 | 10 | BE | 07 | 23 | BB | C9 |
| 210 | A1 | EE | 0F | 83 | CC | F0 | D2 | 1C | FC | E3 | 2D | 93 | FC | A3 | 2D | 93 |
| 220 | 77 | 6B | 55 | 7F | 77 | 7F | 77 | 77 | 6B | 5D | 3E | 5D | 6B | 77 | 77 | 7F |
| 230 | 77 | 5D | 77 | 7F | 77 | 7F | 5D | 6B | 77 | 6B | 5D | 7F | 20 | 5F | 6E | 77 |

```
240  7A 7D 7E 3E 5F 2E 77 3A 7D 3E 1F 6F 77 7B 77 6F
250  1F 3E 5D 6B 77 6B 5D 3E 01 7E 7D 73 7D 7E 01 07
260  7B 7D 7E 7D 7B 07 01 7E 7F 7E 7F 7E 01 3F 7F 3F
270  40 3F 7F 3F 59 36 7F 36 7F 36 4D 4E 7D 23 7F 37
280  7F 00 42 3D 7B 3E 7F 3E 41 4F 7F 37 7F 37 7F 00
290  63 5D 3E 7F 3E 5D 63 00 7F 7B 77 6F 7F 00 20 5F
2A0  6F 77 6F 5F 20 7E 7F 7E 7F 7E 7F 00 3E 5D 6B 77
2B0  7B 7F 00 3F 7F 01 7E 3F 7E 7D 7F 3E 7F 00 7F 3E
2C0  7F 00 7F 77 7F 77 7F 00 59 3E 7B 3E 7F 3E 41 3F
2D0  7F 37 7F 37 7F 00 3E 7F 36 7F 36 7F 00 41 7F 3E
2E0  7F 3E 41 3E 5D 3E 7F 3E 7F 3E 41 49 7F 36 7F 36
2F0  7F 00 40 3F 7B 3F 7B 3F 40 43 3E 6B 36 7F 3E 41

ADDRESS  .0 .1 .2 .3 .4 .5 .6 .7 .8 .9 .A .B .C .D .E .F

300  B9 05 41 A1 83 F8 17 D2 0A A8 83 B9 36 E9 0D 34
310  A9 C6 08 83 37 20 1B 39 2C 0D 0F 30 3F 3D 08 00
320  4F 3F 77 3A 7F 3F 5F 77 7F 6B 7F 5D 7F 3E 6B 7F
330  6B 7F 6B 7F 6B 3E 7F 5D 7F 6B 7F 77 7F 7F 7F 6B
340  7D 7F 7F 7F 7F 7F 6B 7F 7F 7F 4F 37 7B 35 7E 37
350  4F 49 36 7F 36 7F 36 49 1F 6F 37 7B 3D 7E 3F 79
360  76 3F 56 6F 76 79 31 7E 2F 7E 2F 7E 0D 7B 7F 60
370  3F 5B 6F 73 19 66 3F 76 3F 7E 3D 4E 3F 76 3F 7A
380  3F 5C 7F 7E 7F 00 7F 5E 7F 41 3E 7F 3E 7F 3E 41
390  3F 5F 6F 77 7B 7D 7E 7F 7F 7C 7F 7C 7F 7F 77 7F
3A0  77 7F 77 7F 77 7F 7F 7B 7D 7A 7F 7F 77 7F 77 49
3B0  77 7F 77 77 5D 63 7F 63 5D 77 7F 7F 63 5D 3E 7F
3C0  7F 7F 7F 3E 5D 63 7F 7F 7F 7F 3F 5F 6F 7F 7F 7A
3D0  5D 2B 76 2F 5A 7D 3C 5F 6C 77 1B 7D 1E 7B 55 7F
3E0  00 7F 55 6F 6B 14 6B 7F 6B 14 6B 7F 1F 6F 7F 1F
3F0  6F 7F 7F 7F 7F 02 7F 7F 7F 7F 7F 7F 7F 7F 7F 7F

END            CHECKSUM: A9A8
```

Tables 1 and 2, respectively, list by address the microinstructions in hexadecimal code corresponding to the manufacturer's codes needed to specify the mask. The preferred pin connections for the 8048 microprocessors 86 and 88 are described below.

Suitable RAM's 72 usable, optionally, for expanding the data storage capabilities of the microprocessor 86 are commercially available 2111 chips. The address latch 70 can be any suitable latch, such as a 74 LS 377 octal register available from Texas Instruments. A preferred keyboard scanner 56 is a 74 LS 145 and the key and switch matrix can be any suitable conventional design.

A suitable fluorescent tube display device 8 usable in input module 3 is a 15-MT-36 display available from Futaba Industries. The digit and segment drivers 76 and 78 can be chosen from among many available drivers, such as Exar's XR-6118 drivers. Decoder 74 is suitably chosen as a CD4514 four-to-sixteen decoder for a preferred system configuration. Printer interface device 84 can be any suitable known connection between the microprocessor 88 printer drive output lines and a commercially available printer, such as a Seiko Model 210 dot-matrix impact printer.

Figure 12:
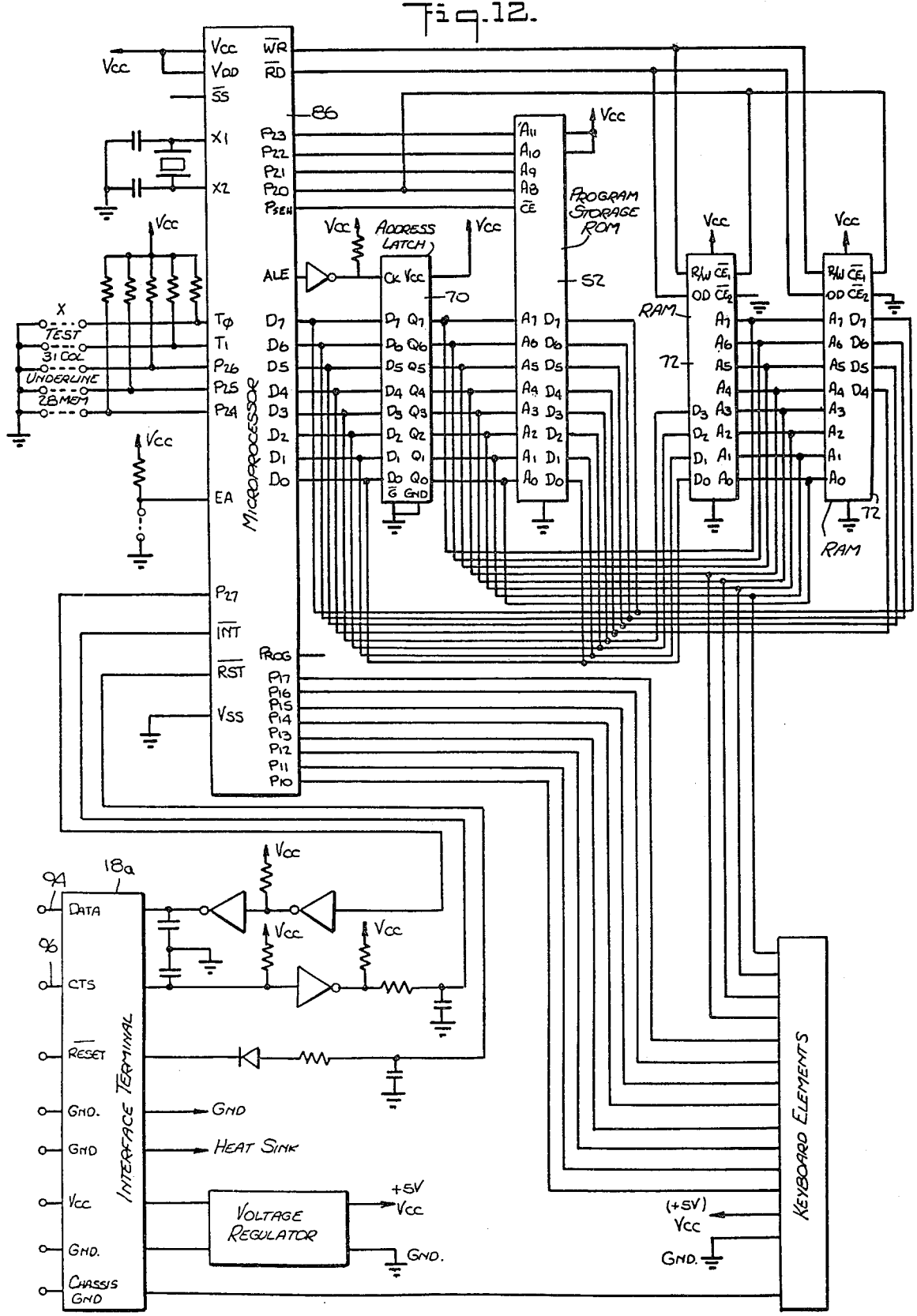
FIGS. 12 and 13 are schematic diagrams of the circuits of FIG. 11 and showing microprocessors and their pin connections.
Figure 13:
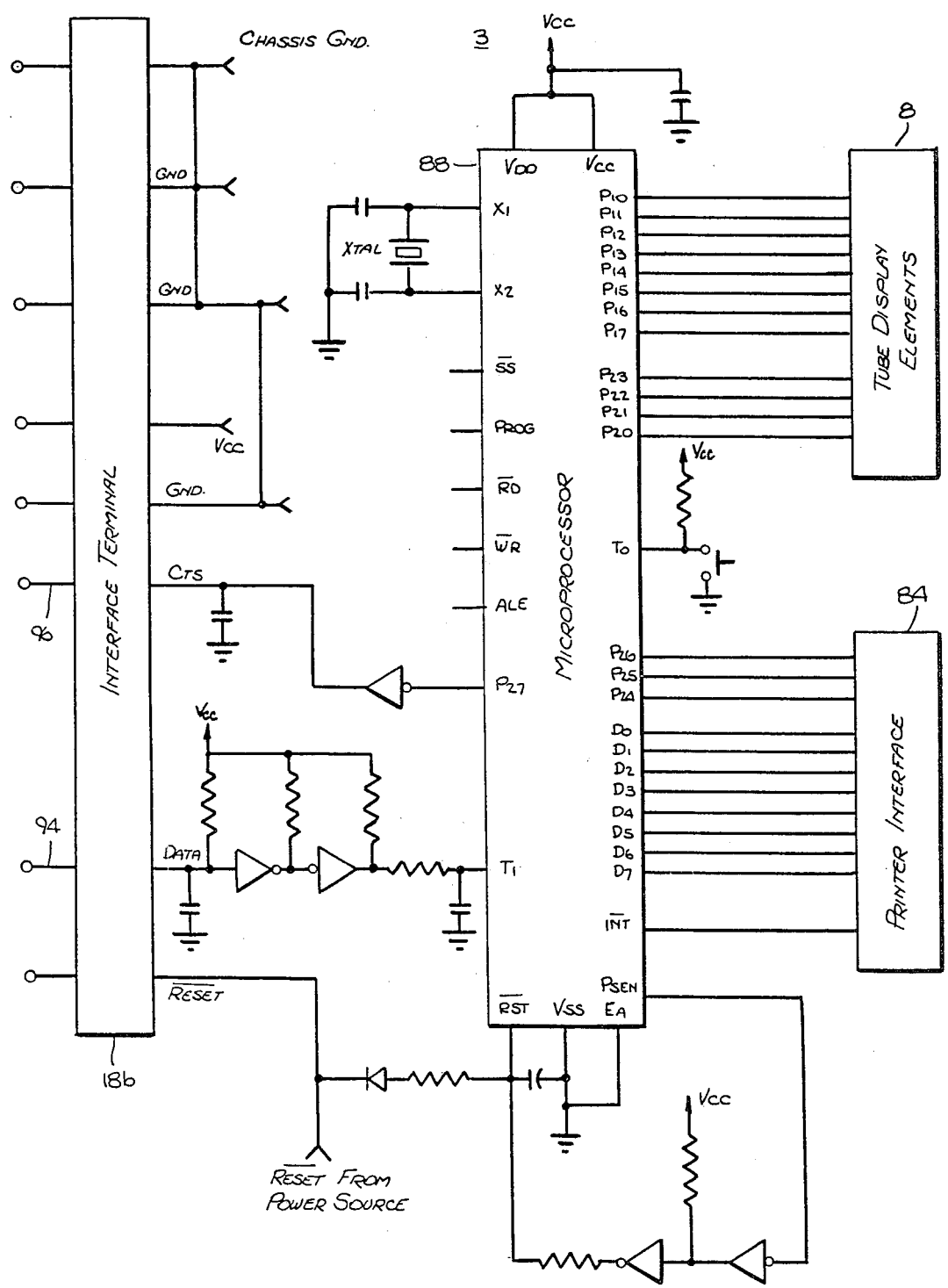

FIGS. 12 and 13 show the pin connections for the preferred 8048 microprocessors 86 and 88 of the input and output modules 2 and 3, respectively. Pin connections for the address latch, program storage ROM and RAM's are made in known ways.

As shown in FIG. 12, the microprocessor 86 (at its upper left side) has two power supply leads $V_{cc}$ and $V_{dd}$ which connect to supply standard voltage to the chip. The single step lead "SS" is not used. Pins X1 and X2 are the crystal input pins which connect to crystal circuits to provide a clock for synchronization of all microprocessor operations. The five pins labelled "T0", "T1", "$P_{26}$," "$P_{25}$" and "$P_{24}$" are connected to provide optional jumper-selectable features. If the jumper for a particular option, such as "test", is in place when the system is powered up, then that option will be performed, e.g. the microprocessor 86 will make certain tests. Other optional jumper selectable features shown include underlining, 31-column printing, memory expansion, etc. The use of jumper selectable features is generally known and those skilled in the art can appreciate the number and scope of other features that can be added.

The "EA" pin is connected to an external access line as shown in FIG. 12 to permit reading of program storage externally (i.e. from the external program ROM 52). Pin "$P_{27}$" is connected at interface terminal 18a to the output data line 94 over which output data from input module microprocessor 86 is serially transmitted to the output data microprocessor 88. All output data and the associated display format information for that data is transmitted out of port "$P_{27}$". The "INT" pin is an interrupt signal pin and is connected to terminal 18a to receive "clear-to-send" communications on signal line 96 from the output module microprocessor 88. A "clear-to-send" signal received by microprocessor 86 indicates the readiness of the output module microprocessor 88 to accept additional output data over signal line 94 for display. A line connected from the power supply in the output module 3 over terminal 18a to reset pin ("RST") serves to reset the microprocessor 86 circuits when the power is turned "on" and to terminate processing when the power is turned "off". The "$V_{ss}$" port is used as the pin connection to ground for the unit. Pins "$P_{10}$" to "$P_{17}$" (lower right side of microprocessor 86 in FIG. 12) are ports for receiving key closure signals from the keyboard elements (i.e. key and switch matrix 90) over the return lines 92 (FIG. 11). These pins are available for keyboard supervision since the control program is stored on the external program ROM 52. Pin "PROG" is unconnected.

Pins "$D_o$" to "$D_7$" are connected to the bi-directional data bus that provides the address that is to be latched in the address latch 70 and also provides the data path for transfer of data to and from the program storage ROM 52 and the external data memories 72. The "ALE" pin connects to a signal line which sends a clock signal to control data storage in address latch 70 by serving as an address latch enable signal. "$P_{sen}$" is a pin for external ROM access and serves as the chip enable for the external program storage ROM 52. Pins "$P_{20}$" to "$P_{23}$" are connected to address lines that are not multiplexed with data on the bi-directional data bus and serve to provide four address bits in addition to those stored in the address latch 70, thus providing a total of 12 address lines to the program ROM 52. "$\overline{RD}$" read and "$\overline{WR}$" write pins are connected to command lines that go to the external memories 72 for control of data read and write communications. The foregoing pin connections correspond to the standard designations for the forty pins of a commercially available 8048 microcomputer chip, such as the NEC Microcomputer μPD8048.

FIG. 13 shows the preferred pin connections for an 8048 microcomputer chip usable as the microprocessor 88 of the output module 3. Ports "$V_{dd}$" and "$V_{cc}$" (at the top of the microprocessor 88 shown in FIG. 13) are standard power supply lead connection pins which typically supply 5 volts to the unit. The "X1" and "X2" are for crystal input connections. Single step ("$\overline{SS}$") and program ("PROG") pins are not used. Likewise, the read ("$\overline{RD}$"), write ("$\overline{WR}$") and address latch enable ("ALE") pins are not used because all program and data storage in the output module microprocessor 88 is handled internally, i.e. no external memories are used. Pin "$P_{27}$" is connected by means of a known buffer to the terminal 18b "clear-to-send" line 96 that sends control signals from the microprocessor 88 to the input module microprocessor 86 to indicate that the output module is available to accept output data from the input module for display. Such output data for display is received serially from the input module over the single data line 94 which connects from terminal 18b to the "$T_1$" pin through a standard double-buffer configuration. The "$T_1$" pin is the standard 8048 pin to which normally a timer counter input line can be connected to provide an internal interrupt. The reset pin "RST" (at the bottom of the microprocessor 88 of FIG. 13) is connected to the power supply source and also to interface terminal 18b to provide a reset signal to the input module 2.

Pins "$V_{ss}$" and "EA" are connected together because internal program storage is used, i.e. the factory-programmed microprocessor mask determines the control program. The connection to the "$P_{sen}$" pin is made as shown to cause a reset to reactivate the system since external program ROM access is not used.

The Interrupt pin "$\overline{INT}$" is connected to the printer interface device 84 to provide individual dot position timing for the printer 10. Buses "$D_o$" to "$D_7$" provide signals to the printer motor control and to the seven print head wires that provide the dots for each character. Pins "$P_{24}$" to "$P_{26}$" respectively are connected to a red/black printer magnet solenoid, the printer reset line and the paper feed magnetic drive. Pin "$T_o$" is connected to the manually operated paper feed switch. These pins are preferably connected by known means through a printer interface device 84 to the terminals of a Seiko Model 210 dot matrix impact printer. The correspondence between microprocessor pins and printer terminals is shown in Table 3 below.

TABLE 3

Correlation Between Output Module 8048 Microprocessor and Seiko Model 210 Printer Terminals.

| 8048 pin | 210 printer terminals |
|---|---|
| $\overline{INT}$ | $T_p$ |
| $D_7$ | M |
| $D_6$ | $S_1$ |
| $D_5$ | $S_2$ |
| $D_4$ | $S_3$ |
| $D_3$ | $S_4$ |
| $D_2$ | $S_5$ |
| $D_1$ | $S_6$ |
| $D_o$ | $S_7$ |
| $P_{24}$ | PFD |
| $P_{25}$ | RED |
| $P_{26}$ | $T_r$ |

In Table 3, the pin designations on the left are those of a standard 8048 microcomputer; the terminal designations on the right are those of a preferred Seiko Model 210 dot-matrix impact printer. Connections between the two components are made in a conventional manner through electronics in interface 84. Interrupt pin ("$\overline{INT}$") on the microprocessor 88 is connected to the printer "$T_p$" pins to receive timing pulses from the printer that control the timing to put dots on the paper. Pin "$D_7$" of the microprocessor 88 is connected to the printer motor control line that turns the printer motor on and off in order to make the print head move across the paper. The microprocessor pins "$D_6$" to "$D_o$" connect to printer terminals "$S_1$" to "$S_7$" to activate the individual wires in the print head that provide the rows of dots that make up the characters on the printed paper. The "$P_{24}$" pin on the microprocessor 88 is connected to the paper feed solenoid ("PFD"). Pin "$P_{23}$" is connected to a red ribbon solenoid ("RED") that selects the red portion of the red/black ribbon so that the printing will be in red when it is activated. Pin "$P_{26}$" connects to terminals "Tr" to provide the reset signal from the printer that indicates when the print head is at the margin and the printer is ready to start printing.

Pins "$P_{20}$" to "$P_{23}$" of microprocessor 88 are the four digit position outputs that go to the decoder 57 for scanning of the fluorescent tube display 8. Pins "$P_{10}$" to "$P_{17}$" provide the eight segment outputs that drive the segment lines for the display 8.

The interface terminals 18a and 18b in FIGS. 12 and 13, respectively indicate the electrical interface terminals between input module 2 and output module 3. Terminals 18a and 18b connect by means of the snap-in jacks 16 to the cable 14 (see FIG. 2), thereby providing an eight signal line interface between modules. Four signal lines are used to make ground connections; a fifth line is used to provide power from the output module to the input module; a sixth line is a data line for serial data communications from the input module to the output module; a seventh line is a reply line to send "clear-tosend" signals from the output module to the input module to indicate when the output module can receive data to be displayed; and an eighth line acts as a reset line to provide reset signals to the input module responsive to the power supply. Those skilled in the art will understand that the ground connections can be combined into a single line or can be made through a mechanical connection between housings. Further, the input and output modules can be supplied with separate power sources, thereby making elimination of power and reset line connection possible. Thus, electrical interface between input and output modules of the invention is made very simple.

In operation, the user enters data to be processed by pressing down data keys 34 (see FIG. 7) chosen by their corresponding key identification symbols 34a. The depression of the data keys causes corresponding key closures in the key and switch matrix 90 (see FIG. 11). The key closure enables scanning signals from keyboard scanner 56 to be returned over return lines 92 to microprocessor 86. The microprocessor pin location (i.e. pins $P_{10}$ to $P_{17}$ in FIG. 12) at which a return signal is received, and its timing, identifies for the microprocessor 86 the input data signals to be processed (e.g. binary signals representing numerals 0 to 9). Likewise, the user presses down function keys 36 (see FIG. 7) chosen by their function key identification symbols 36a to generate electric signals which control the microprocessor processing of the input data. General calculator operating modes, such as the number of decimal places, are set on switches 38 in accordance with switch position identification symbols 38a. The key and switch matrix 90 serves to generate electrical signals corresponding to data key depression, function key depression and switch settings.

Data entered by operation of data keys 34 is processed by microprocessor 86 (FIG. 11) in accordance with the functions and switch settings specified by operation of function keys 36 and switches 38. Data processing by microprocessor 86 is controlled by the microinstruction program contained in the external program storage ROM 52. The program is defined by the mask of ROM 52 during manufacture by known techniques. Data to be displayed that results from the processing and output display format signals are generated by the microprocessor 86. Both the output data and the display format signals are then transmitted in serial form from input module microprocessor 86 to output module microprocessor 88 over the single-line data bus 94. Reply line 96 sends a "clear-to-send" signal from the output module 3 to the input module 2 to indicate that the output module microprocessor 88 is available to receive such data from the input module microprocessor 86. After receipt of output data and format signals from the input module 2, microprocessor 88 further processes those signals for display on flourescent display 8 or printer 10 in accordance with the display format. The flourescent tubes of display 8 are energized under the control of microprocessor 88. Likewise, the dot-matrix wires and movement of the print head, paper feed and type-ribbon position (either black or red) are controlled by microprocessor 88. The program instructions for microprocessor 88 are contained in the internal program storage ROM of that microprocessor 88 and are defined during manufacturing by a program mask developed by known processes.

The electrical interface between the input and output modules 2 and 3 is established by means of a cable 14 which has snap-in jacks 16 that the user connects with terminals 18a and 18b in the input module housing 6 and output module housing 12, respectively. The cable 14 permits the user to operate the calculator 1 with the modules 2 and 3 mechanically connected to form a unitary calculator housing (see FIG. 1), or with the modules 2 and 3 physically separated (as shown in FIG. 3) and located at different places convenient to the user's work habits. Different lengths of cable 14 can be used to provide different spacing capabilities.

Because of the arrangements whereby all signal transmissions from input module 2 to output module 3 occur serially along a single line, the connecting cord 14 between the modules can be made very light in weight and flexible. Moreover, simple connectors 16 of standard construction may be utilized so that expense and complexity is at a minimum.

Electrical connection of input module 2 to output module 3 provides a basic calculator capable of performing basic arithmetic functions. When the user wishes to change the basic calculator to a scientific calculator, for example, the user substitutes scientific input module 2' for basis module 2. This is done by unplugging the jack 16 from the interface terminal 18a of input module 2 and plugging the jack into input terminal 18a' of different input module 2'. This electrically connects the different input module 2' to the same output module 3. The substituted input module 2' contains a different keyboard layout 5' (see FIG. 8) having different function keys 36' and different function key identification symbols 36a' which correspond to functions available on a scientific calculator. The input module 2' has different electronic circuits including a different program stored in ROM 52. The new program provides instructions for processing data in accordance with scientific functions.

In this way, the invention provides different calculators by substituting one input module for another. The change of input modules changes the stored program which establishes the calculator's function capabilities and simultaneously changes the keyboard architecture to conform to the changed program. This saves needless duplication of expensive output components.

The preferred mode, described above, accomplishes this using a very simple electrical interface and further provides a simple way to optionally couple the modules together to form a unitary combined housing configuration.

Having thus described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. A modular calculator, comprising:
    a. an input module including an input module housing, a keyboard having data keys and function keys mounted on said input module housing, input module electrical circuits contained in said input module housing and connected to said data keys and to said function keys for receiving data corresponding to operation of said data keys, for processing the received data according to operation of said function keys and for organizing the processed data into electrical signals for serial transmission, said input module electrical circuits including an output terminal on which electrical signals corresponding to the processed data are provided;

b. an output module including an output module housing, a display device mounted on said output module housing, output module electrical circuits contained in said output module housing and including an input terminal for receiving said processed data electrical signals by serial transmission from said output terminal and for further processing said signals for data presentation on said display device;

c. releasable mechanical connecting means for connecting said input module housing to said output module housing to form a uniform calculator housing; and d. electrical connector means for electrically connecting said output terminal of said input module with said input terminal of said output module; whereby said modules cooperate to provide a calculator whose keyboard and calculator function control components are housed in said input module and whose display components are housed in said output module, said electrical connector means comprising an elongated wire which enables said calculator to operate when said input and output module are physically separated.

2. A modular calculator as defined in claim 1, wherein said input module keyboard includes user settable switches having switch positions corresponding to optional operating modes of said input module electric circuits.

3. A modular calculator as defined in claim 2, wherein said input module electrical circuits include means for organizing for serial transmission to the output module electrical signals which control the format according to which data is to be displayed in the output module, and wherein said output module electrical circuits include means for receiving the display format electrical signals from the input module.

4. A modular calculator as defined in claim 1, wherein said electrical connector means comprises a single data communication line for serial transmission of data from said input module to said output module and wherein said electrical connector means further comprises a reply line electrical interconnecting said input and output modules for the transmission of a clear-to-send signal from said output module to said input module.

5. A modular calculator as defined in claim 4, wherein said electrical connector means further comprises a power supply line and a ground line electrically interconnecting said input and output modules for supplying one of said modules with power from said other of said modules.

6. A modular calculator, comprising:

a. an input module including an input module housing, a keyboard having data keys and function keys mounted on said input module housing, input module electrical circuits contained in said input module housing and connected to said data keys and to said function keys for receiving data corresponding to operation of said data keys, for processing the received data according to operation of said function keys and for organizing the processed data into electrical signals for serial transmission, said input module electrical circuits including an output terminal on which electrical signals corresponding to the processed data are provided;

b. an output module including an output module housing, a display device mounted on said output module housing, output module electrical circuits contained in said output module housing and including an input terminal for receiving said processed data electrical signals by serial transmission from said output terminal and for further processing said signals for data presentation on said display device;

c. releasable mechanical connecting means for connecting said input module housing to said output module housing to form a uniform calculator housing; and d. electrical connector means for electrically connecting said output terminal of said input module with said input terminal of said output module; whereby said modules cooperate to provide a calculator whose keyboard and calculator function control components are housed in said input module and whose display components are housed in said output module, said input module electrical circuits including an input module microprocessor and said output module electrical circuits including an output module microprocessor, wherein said serial transmitted electrical signals are transmitted from said input module microprocessor and received by said output module microprocessor.

7. A modular calculator as defined in claim 6, wherein said input module electrical circuits include a key and switch matrix which has strobe signal input lines and return signal output lines and said input module microprocessor is electrically connected to said key and switch matrix to detect key closure by sending strobe signals thereto and receiving return signals therefrom.

8. A modular calculator as defined in claim 6, wherein said input module electronic circuits further include a program instruction read only memory integrated circuit electrically connected to said input module microprocessor for providing a control microprogram therefor.

9. A modular calculator as defined in claim 8, wherein said input module microprocessor is an 8048 single chip microcomputer and wherein said program instruction read only memory is a 8332 read only memory.

10. A modular calculator as defined in claim 8, wherein said input module electrical circuits further include an external data random access memory electrically connected to said input module microprocessor for external data storage and retrieval therefor and an octal register electrically connected to said input module microprocessor to serve as an address latch.

11. A modular calculator as defined in claim 10, wherein said input module microprocessor is an 8048 single chip microcomputer and said program instruction read only memory is a 8332 read only memory.

12. A modular calculator as defined in claim 6, wherein said display device is a fluorescent display.

13. A modular calculator as defined in claim 12, wherein said output module electrical circuits include a segment driver, a digit driver and a decoder electrically connected to said output module microprocessor and said fluorescent display to drive said fluorescent display in response to output information signals received from said output module microprocessor.

14. A modular calculator as defined in claim 6, wherein said display device is a printer electrically connected to said output module microprocessor to be driven thereby.

15. A modular calculator as defined in claim 14, wherein said printer is a dot-matrix impact printer.

16. A modular calculator, comprising:
  a. an input module including an input module housing, a keyboard having data keys and function keys mounted on said input module housing; input module electrical circuits contained in said input module housing and connected to said data keys and to said function keys for receiving data corresponding to operation of said data keys, for processing the received data according to opertion of said function keys and for organizing the processed data into electrical signals for serial transmission, said input module electrical circuits including an output terminal on which electrical signals corresponding to the processed data are provided;
  b. an output module including an output module housing, a display device mounted on said output module housing, output module electrical circuits contained in said output module housing and including an input terminal for receiving said processed data electrical signals by serial transmission from said output terminal and for further processing said signals for data presentation on said display device;
  c. releasable mechanical connecting means for connecting said input module housing to said output module housing to form a uniform calculator housing; and
  d. electrical connector means for electrically connecting said output terminal of said input module with said input terminal of said output module; whereby said modules cooperate to provide a calculator whose keyboard and calculator function control components are housed in said input module and whose display components are housed in said output module, the surfaces of said housings adjacent said mutually facing surfaces being positioned to extend flush from one housing to the other so that when the housings are connected together a single unitary structure is provided.

17. A modular calculator as defined in claim 16, wherein said interlocking formations are located and arranged so as to be concealed from view when the housings are connected together.

18. A modular calculator, comprising:
  a. an input module including an input module housing, a keyboard having data keys and function keys mounted on said input module housing, input module electrical circuits contained in said input module housing and connected to said data keys and to said function keys for receiving data corresponding to operation of said data keys, for processing the received data according to operation of said function keys and for organizing the processed data into electrical signals for serial transmission, said input module electrical circuits including an output terminal on which electrical signals corresponding to the processed data are provided;
  b. an output module including an output module housing, a display device mounted on said output module housing, output module electrical circuits contained in said output module housing and including an input terminal for receiving said processed data electrical signals by serial transmission from said output terminal and for further processing said signals for data presentation on said display device;
  c. releasable mechanical connecting means for connecting said input module housing to said output module housing to form a uniform calculator housing; and
  d. electrical connector means for electrically connecting said output terminal of said input module with said input terminal of said output module; whereby said modules cooperate to provide a calculator whose keyboard and calculator function control components are housed in said input module and whose display components are housed in said output module,
  e. said input and output module housings having mutually facing surfaces, said releasable mechanical connecting means comprising mutually cooperating interlocking formations on said surfaces, and said interlocking formations comprising first and second mutually interlocking flanges.

19. A modular calculator as defined in claim 18, wherein said first flange extends downwardly across the mutually facing surface of said input module housing and said second flange member extends upwardly across the mutually facing surface of the output module housing.

20. A modular calculator as defined in claim 19, wherein the mutually facing surface of said input module housing is formed with a depression and said first flange member is formed flush with said mutually facing surface of said input module housing and the upper surface of said depression, and wherein said second flange member is formed as a projection on the mutually facing surface of said output module housing so that the second flange member is concealed from view in the depression in said input module housing and said input housing is brought flush with said output module housing in the combined modular unit.

21. A modular calculator, comprising:
  a. an input module including an input module housing, a keyboard having data keys and function keys mounted on said input module housing, input module electrical circuits contained in said input module housing and connected to said data keys and to said function keys for receiving data corresponding to operation of said data keys, for processing the received data according to operation of said function keys and for organizing the processed data into electrical signals for serial transmission, said input module electrical circuits including an output terminal on which electrical signals corresponding to the processed data are provided;
  b. an output module including an output module housing, a display device mounted on said output module housing, output module electrical circuits contained in said output module housing and including an input terminal for receiving said processed data electrical signals by serial transmission from said output terminal and for further processing said signals for data presentation on said display device;
  c. releasable mechanical connecting means for connecting said input module housing to said output module housing to form a uniform calculator housing; and d. electrical connector means for electrically connecting said output terminal of said input module with said input terminal of said output module; whereby said modules cooperate to provide a calculator whose keyboard and calculator function control components are housed in said input module and whose display components are housed in said output module, said input module electrical output terminal comprising an output module interface female connector, said output module electrical input terminal comprising an input module interface female connector and said electrical connector means comprising a cable having male terminal elements at each end electrically connecting said female connectors.

22. A modular calculator as defined in claim 21, wherein said cable is an 8-wire coiled cable.

23. A modular calculator as defined in claim 22, wherein said input module housing and said output module housing are formed to conceal said cable from view when said modules are mechanically connected together.

24. A modular calculator as defined in claim 23, wherein one of said housings is formed with a cavity in which to receive said cable.

25. A modular calculator system, comprising:
a. a plurality of input modules, each including an input module housing, a keyboard having data keys and function keys mounted on said input module housing input module electrical circuits contained in said input module housing and connected to said data keys and to said function keys for receiving data corresponding to operation of said data keys, for processing the receiving data according to operation of said function keys and for organizing the processed data into electrical signals for serial transmission, said input module electrical circuits including an output terminal on which electrical signals corresponding to the processed data are provided;
b. an output module including an output module housing, a display device mounted on said output module housing, output module electrical circuits contained in said output module housing and including an input terminal for receiving said processed data electrical signals by serial transmission from said output terminal and for further processing said signals for data presentation on said display device;
c. releasable mechanical connecting means for connecting the housing of a selected one of said input modules to said output module housing to form a unitary calculator housing; and
d. an electrical connector electrically connecting said output terminal of said selected one of said input module with said input terminal of said selected one of said input modules; whereby each of said input modules cooperates in an interchangeable way with said output module to provide a calculator which keyboard and calculator function control components are housed in said selected one of said input modules and whose display components are housed in said output module.

26. A modular calculator system, comprising:
a. a plurality of input modules, each including an input module housing, a keyboard having data keys and function keys mounted on said input module housing, input module electrical circuits contained in said input module housing and connected to said data keys and to said function keys for receiving data corresponding to operation of said data keys, for processing the received data according to operation of said function keys and for organizing the processed data into electrical signals for serial transmission, said input module electrical circuits including an output terminal on which electrical signals corresponding to the processed data are provided;
b. a plurality of output modules, each including an output module housing, a display device mounted on said output module housing, output module electrical circuits contained in said output module housing and including an input terminal for receiving said processed data electrical signals by serial transmission from said output terminal of a selected one of said input modules, and for further processing said signals for data presentation on said display device;
c. releasable mechanical connecting means for connecting the housing of a selected one of said input modules to the housing of a selected one of said output modules to form a unitary calculator housing; and
d. an electrical connector electrically connecting said output terminal of said selected one of said input modules with said input terminal of said selected one of said input modules; whereby each of said input modules cooperates in an interchangeable way with each of said output module to provide a calculator whose keyboard and calculator function control components are housed in said selected one of said input modules and whose display components are housed in said output modules.

27. A modular calculator comprising:
a. an input module having a input module housing, a keyboard including data keys, function keys and operating mode switches mounted on said input module housing, input module electrical circuits contained in said input module housing and connected to said data keys and to said function keys for receiving data corresponding to operation of said data keys, for processing the received data according to operation of said function keys and for organizing the processed data into electrical signals, said electrical circuits comprising an 8048 type microcomputer, a key and switch matrix electrically connected to receive stroke signals from said microcomputer and to delivery key closure response signals to said microcomputer in response to use of said keys, a 8332 microprogram storing read only memory electrically connected to provide control instructions to said microcomputer, an address latch electrically connected to said microcomputer, a random acess memory electrically connected to provide external data storage and retrieval for said microcomputer, and output terminals electrically connected to said microcomputer on which electrical signals corresponding to the processed data are provided;
b. an output module having a output module housing, a fluorescent tube display and a dot-matrix printer mounted on said output module housing, output module electrical circuits contained in said output module housing and including input terminals connected to said output device microcomputer for receiving said processed data electrical signals by serial transmission from said output terminals and for further processing said signals for data presentation on said display and printer, said output module electrical circuits comprising an 8048 type microcomputer, a decoder chip, 0 digit driver, and a segment driver, said decoder and drivers being electrically connected to each other and to said fluorescent tube display and microcomputer so as to provide display of output in data response to signals from said microcomputer; means electrically connecting said microcomputer with said printer for driving said printer in response to signals generated by said microcomputer;

c. releasable mechanical connection means connecting said input module housing to said output module for housing to form a unitary calculator housing; and d. cable means electrically connecting said output terminals to said input terminals to provide serial output data communication between said input module microcomputer and said output module microcomputer.

28. A modular calculator as defined in claim 27, wherein said input module microprocessor and said output module microprocessor are of the same construction.

* * * * *

UNITED STATES PATENT AND TRADEMARK OFFICE
CERTIFICATE OF CORRECTION

PATENT NO. : 4,379,336

DATED : April 5, 1983

INVENTOR(S) : Yamamoto, et al.

It is certified that error appears in the above-identified patent and that said Letters Patent is hereby corrected as shown below:

Column 26, line 23, "basis" to read -- basic --;

Column 31, line 34, "receiving" to read -- received --.

Signed and Sealed this

Seventeenth Day of July 1984

[SEAL]

Attest:

GERALD J. MOSSINGHOFF

Attesting Officer     Commissioner of Patents and Trademarks